(12) United States Patent
Brune et al.

(10) Patent No.: US 6,285,190 B1
(45) Date of Patent: Sep. 4, 2001

(54) SKIN DEPTH COMPENSATION IN UNDERGROUND BORING APPLICATIONS

(75) Inventors: Guenter W. Brune, Bellevue; John E. Mercer, Kent; Shiu S. Ng, Kirkland, all of WA (US)

(73) Assignee: Digital Control Incorporated, Renton, WA (US)

( * ) Notice: Subject to any disclaimer, the term of this patent is extended or adjusted under 35 U.S.C. 154(b) by 0 days.

(21) Appl. No.: 09/323,722

(22) Filed: Jun. 1, 1999

(51) Int. Cl.[7] .............................. G01V 3/08; G01V 3/165; E21B 47/02; E21B 47/022

(52) U.S. Cl. .............. 324/326; 324/207.12; 324/207.26; 324/225; 324/335; 175/45; 342/459

(58) Field of Search ........................ 324/207.12, 207.17, 324/207.26, 225, 326–329, 334, 335, 345, 346, 247; 175/45; 342/459

(56) References Cited

U.S. PATENT DOCUMENTS

| | | | |
|---|---|---|---|
| 3,226,633 | * 12/1965 | Schneider | 324/339 |
| 4,451,789 | * 5/1984 | Meador | 324/335 X |
| 4,710,708 | 12/1987 | Rorden et al. | 324/207.26 |
| 4,845,433 | * 7/1989 | Kleinberg et al. | 324/329 X |
| 4,933,640 | * 6/1990 | Kuckes | 175/45 X |
| 5,019,822 | * 5/1991 | Kirkland | 324/326 X |
| 5,119,028 | * 6/1992 | Mooney et al. | 324/326 |
| 5,157,605 | * 10/1992 | Chandler et al. | 324/335 X |
| 5,337,002 | 8/1994 | Mercer | 324/326 |
| 5,585,726 | * 12/1996 | Chau | 324/326 |
| 5,654,638 | * 8/1997 | Shoemaker | 324/329 |
| 5,917,325 | * 6/1999 | Smith | 324/326 |
| 6,014,026 | * 1/2000 | Mercer | 324/326 |

OTHER PUBLICATIONS

J. R. Wait and L. L. Campbell, The Fields of an Oscillating Magnetic Dipole Immersed in a Semi–Infinite Conducting Medium, Jun. 1953, Journal of Geophysical Research, vol. 58, No. 2 pp 167–178.

H. K. Sacks, Eelecromagnetic Technique for locating Boreholes, Report of Investigations 8302, US Dept of the Interior (pp 1–14) 1978 (No Month).

* cited by examiner

*Primary Examiner*—Gerard R. Strecker
(74) *Attorney, Agent, or Firm*—Michael Pritzkau

(57) ABSTRACT

Arrangements, specific apparatus and associated methods for skin depth compensation in underground boring applications are described. Compensation for skin depth error is accomplished by measuring a locating signal transmitted from a boring tool such that measurements of the locating signal include skin depth error introduced as a result of the electrical conductivity characteristic of the earth. Thereafter, the measurements are used in a way which determines a skin depth corrected position of the boring tool. In one aspect, a multi-frequency approach is provided which utilizes measured intensities of the locating field at two or more frequencies to extrapolate a zero frequency value of intensity. The zero frequency value of intensity is then used in position determination. The multi-frequency approach does not require knowledge of earth properties or ground surface geometry since components of the measured magnetic field intensities of the locating field measured at nonzero frequencies contain property and geometry effects and pass them on to extrapolated zero frequency values. Skin depth compensation in a number of locating scenarios using a single frequency locating signal is introduced.

44 Claims, 11 Drawing Sheets

SKIN DEPTH COMPENSATION IN UNDERGROUND BORING APPLICATIONS

BACKGROUND OF THE INVENTION

The present invention is related generally to the field of locating and/or guiding an underground boring tool using a locating signal which is transmitted through the ground and, more particularly, to a method and associated apparatus for locating and/or guiding the boring tool in a way which compensates for skin effect that potentially introduces error in locating and/or guiding the boring tool as a result of conductivity of the earth through which the locating signal passes.

Referring to FIG. 1, boring tools are typically guided or located by transmitting a dipole field from a dipole transmitter which is positioned within the drill bead of the boring tool. The locating/dipole field is an oscillating signal that is generally emitted from a dipole antenna oriented along the rotational axis of the drill head. FIG. 1 illustrates a coordinate system including x, y and z axes with a dipole transmitter D at its origin. For a point p, at a radius r from the origin, the dipole equations are given as:

$$B_x = \frac{3x^2 - r^2}{r^5} \quad (1)$$

$$B_y = \frac{3xy}{r^5} \quad (2)$$

$$B_z = \frac{3xz}{r^5}, \text{ and} \quad (3)$$

$$r^2 = x^2 + y^2 + z^2 \quad (4)$$

Where $B_x$, $B_y$ and $B_z$ represent orthogonal components of the dipole field at point p. The dipole equations are recited herein for the benefit of the reader since these equations form a fundamental basis for the use of a dipole field in locating applications. One such locating system is described, for example, in U.S. Pat. No. 5,337,002 which is commonly assigned with the present application. Traditionally, boring tool systems have not used compensation for conductivity of the soil even though this conductivity introduces a phenomenon commonly referred to as skin effect. While skin effect can result in significant locating errors, applicants submit that prior art systems have not provided such compensation, at least in part, since it is perceived in the art that compensation for skin effect is an extremely complex proposition.

What prior art system designers have generally done is to altogether ignore skin effect. This is tantamount to an assumption of a non-conducting earth. Accordingly, the electromagnetic field emitted by the magnetic dipole of a transmitter into a non-conducting medium (such as air) is described mathematically by the well known cubic law of a magnetic dipole (see FIG. 1). Unfortunately, however, as a direct result of skin depth, drilling in the earth can produce significant deviations from the cubic law when a typical oscillating magnetic dipole field is used. The latter term describes a magnetic dipole having a signal strength that varies sinusoidally with time.

The present invention provides a highly advantageous and heretofore unseen method and associated apparatus which provide compensation for skin effect in underground boring tool applications.

SUMMARY OF THE INVENTION

As will be described in more detail hereinafter, there are disclosed herein arrangements, apparatus and associated methods for skin depth compensation in underground boring applications. Accordingly, in an overall method of operating a system in which a boring tool is moved through the ground in a region which includes an electrical conductivity characteristic and where the system includes an above ground arrangement for tracking the position of and/or guiding the boring tool as the boring tool moves through the ground and in which the system is configured for transmitting a locating signal between the boring tool and the arrangement in the region, the improvement comprises compensating for skin depth error by measuring the locating signal such that measurements of the locating signal include skin depth error introduced as a result of the electrical conductivity characteristic and, thereafter, using the measurements in a way which determines a skin depth corrected position of the boring tool.

In one aspect of the invention a multi-frequency approach is provided which utilizes measured intensities of the locating field at two or more frequencies to extrapolate a zero frequency value of locating signal intensity. The zero frequency value of intensity is then used in position determination. The multi-frequency approach may be used in conjunction with walk-over type locators or with one or more above ground receivers designed for receiving the locating signal at fixed position(s). In one feature, the multi-frequency approach of the present invention does not require knowledge of earth properties or ground surface geometry. The components of the measured magnetic field intensities of the locating field measured at their selected frequencies contain property and geometry effects and pass them on to extrapolated zero frequency values.

In another aspect of the invention, certain intensity measurements of the locating signal are used to determine a value for skin depth to be used during subsequent drilling, these certain measurements being obtained in a calibration procedure by transmitting the locating signal from the boring tool on the surface of the ground to the above ground arrangement prior to drilling.

In still another aspect of the invention, a determined value of skin depth is used in one locating scenario with a walkover detector in which the walkover detector is used to establish an overhead position directly above the boring tool using a locating signal transmitted at a single frequency. The measured overhead signal strength of the locating signal transmitted from the boring tool is then used in conjunction with the determined value of the skin depth to determine the depth of the boring tool below the overhead position on the surface of the ground such that the depth of the boring tool is established based at least in part on the skin depth.

In another locating scenario, with the locating signal transmitted at a single frequency, the boring tool moves through the ground along an intended path while transmitting the locating signal and moves in an orientation which includes pitch. The boring tool includes pitch sensing means and the locating signal exhibits a field defined forward point at the surface of the ground with the boring tool at a particular point along the intended path. The field defined forward point being vertically above an inground forward point on the intended path through which the boring tool is likely to pass. The boring tool is located by using a walkover detector to receive electromagnetic data which identifies the forward point. Signal strength of the locating signal is then measured at the forward point, as transmitted from the boring tool at the particular point, and the measured signal strength of the locating signal is used at the forward point in conjunction with the determined value of the skin depth and a sensed pitch value to determine the depth of the boring tool referenced to the particular point and to determine a forward distance on the intended path from the particular point at which the boring tool is located to the in-ground forward point.

Alternatively, the field defined forward point may be located on or immediately above the surface of the ground and an overhead point may be identified on or immediately above the surface of the ground directly above the boring tool at the particular point. The forward distance is measured between the overhead point and the forward point as, defined at the surface of the ground. Using the forward distance, the determined value of skin depth and certain characteristics of the locating signal at the forward point, a skin depth corrected depth of the boring tool at the particular point is determined.

In another alternative, the intended path of the boring tool in the region is configured such that the forward point is at a higher elevation on the surface of the ground than the particular point. The actual depth of the boring tool is then established at the particular point and a vertical elevation difference is measured between the particular point and the forward point. Thereafter, the locating signal is sensed at the forward point while the boring tool is at the particular point to determine an uncorrected depth of the boring tool which is subject to skin depth error. Using the measured vertical elevation difference, the actual depth of the boring tool at the particular point and the uncorrected depth of the boring tool measured from the forward point, a forward point skin depth correction factor is determined. During subsequent drilling operations the forward point skin depth correction factor is used in determining skin depth corrected depth with the boring tool at subsequent particular points.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
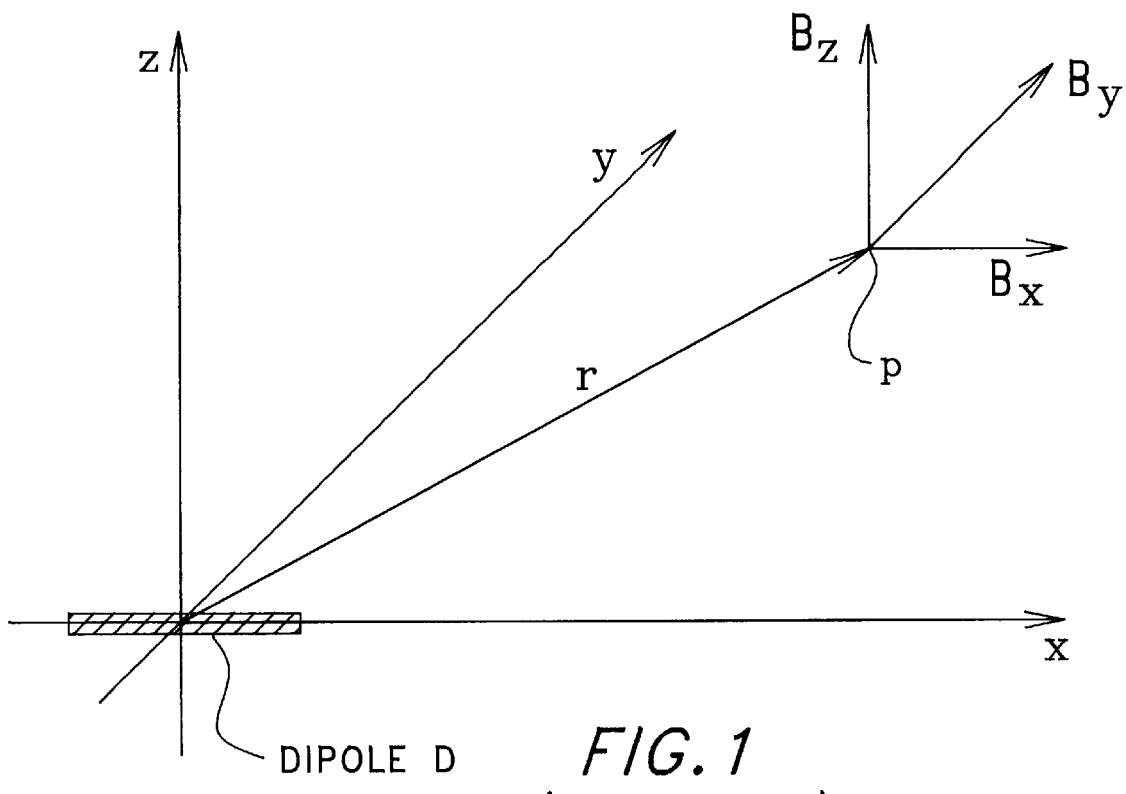
FIG. 1 is a diagrammatic illustration of a coordinate system for purposes of describing the well know magnetic dipole equations.
Figure 2:
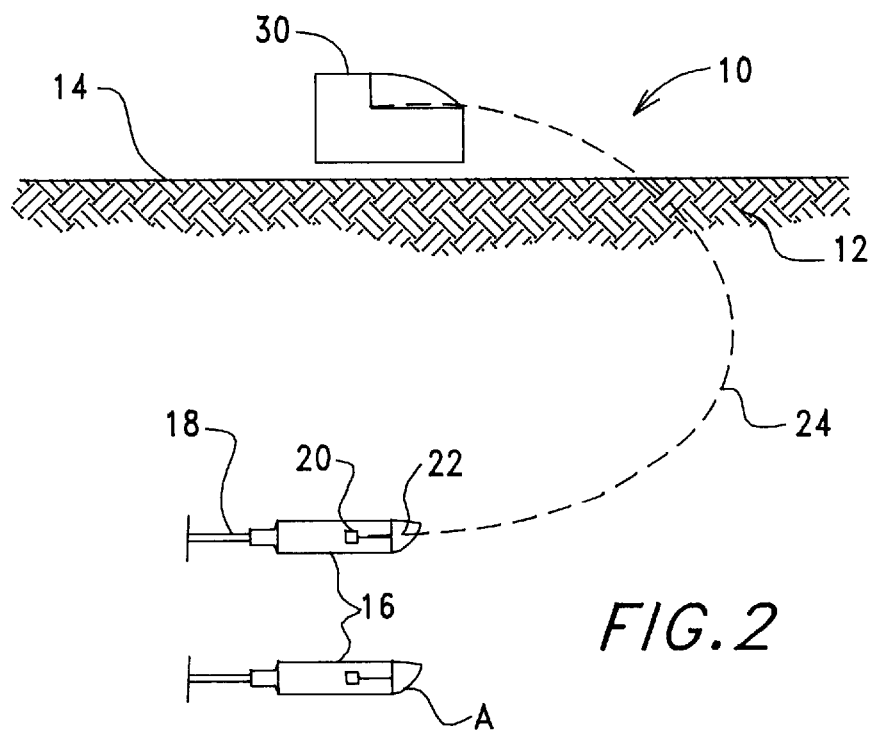
FIG. 2 is a diagrammatic elevational view of a horizontal drilling operation being performed in a region of ground using a portable walkover detector, shown here to illustrate the effects of skin depth on locating the boring tool.

Attention is immediately directed to FIG. 2 which illustrates a boring system 10 operating in a region 12. It is noted that like reference numbers are used to refer to like components wherever possible throughout the various figures. The surface of the ground is indicated by the reference number 14. System 10 includes a boring tool 16 that is positioned on the end of a drill string 18 which is only partially shown. Boring tool 16 includes a dipole transmitter 20 having an antenna 22 that transmits a dipole locating field 24. The latter is received using a walkover portable locator/detector 30. Specific details regarding the implementation of system 10, as well as details regarding the implementation of other types of systems in accordance with the present invention will be given at appropriate points hereinafter. For the moment, discussions will be limited to more general details regarding skin effect as related to the operation of system 10 in order to facilitate the reader's understanding.

Still referring to FIG. 2, locating field 24, emitted by antenna 22 into a non-conducting medium (not shown) such as air is described mathematically by the cubic law, as mentioned above. However, drilling takes place in the earth such as, for example, in region 12 which is assumed to possess electrical conductivity characteristics. These characteristics result in significant deviations from the cubic law when locating field 24 varies sinusoidally in time at a frequency f. With conductivity of region 12 denoted as the penetration distance of locating field 24 as well as the shape of the magnetic field lines which make up the field depend on the frequency and conductivity parameters. Penetration distance is often called skin depth and is defined as:

$$\delta = \frac{1}{\sqrt{\pi f \mu \sigma}} \quad (5)$$

where $\mu$ denotes the permeability of the earth and $\delta$ is the skin depth. Thus, skin depth decreases if conductivity, $\sigma$, permeability, $\mu$, or frequency, f, increase. Conversely, skin depth becomes infinite at zero frequency or conductivity, in which case the magnetic field is again described by the magnetic dipole relationship. The significance of the zero frequency characteristics will become apparent at an appropriate point below. Increasing conductivity and/or frequency serve to weaken the magnetic flux intensity recorded by locator 30 above ground. If skin effect is not accounted for, the boring tool can appear to be at a position farther from the detector than in actuality. In the present example, where measurements are being taken with a walk-over locator directly over the drill head (OH), the transmitter can appear deeper, at position A, where the boring tool is shown in phantom.

Figure 3:
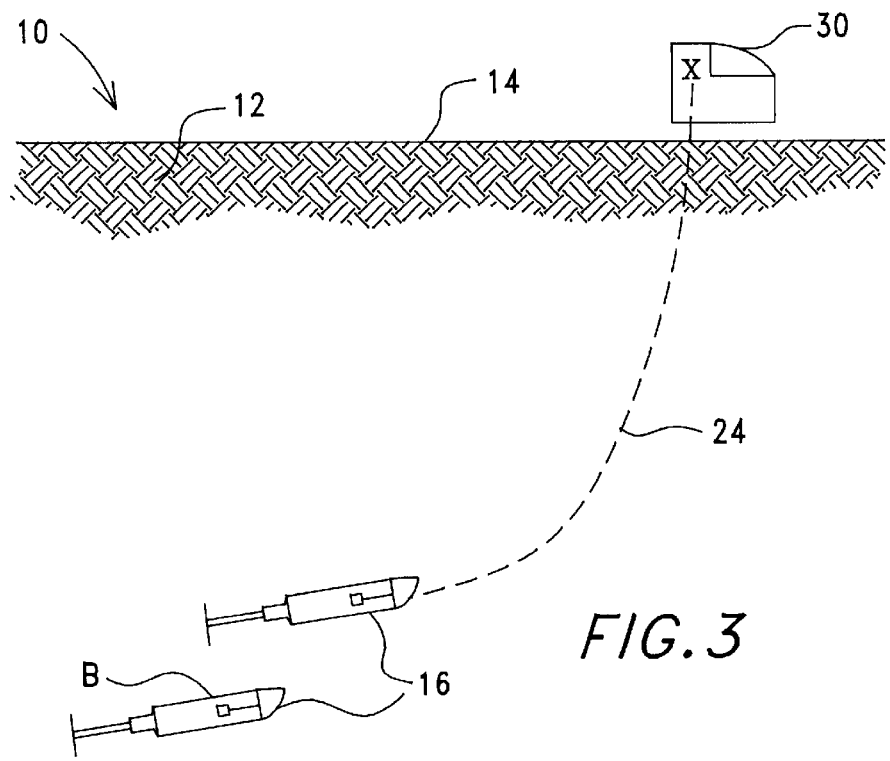
FIG. 3 is a diagrammatic elevational view of another horizontal drilling operation being performed in a region of ground using a portable walkover detector, shown here to illustrate the effects of skin depth on locating the boring tool with the walkover detector at a forward locate point.

Referring now to FIG. 3, system 10 is shown once again with locator 30 at a different position. Specifically, the locator is shown at what is referred to as a forward negative locate point (FNLP) or, more simply, forward locate point (FLP) (see, for example, above referenced U.S. Pat. No. 5,337,002). An "X" is indicative of the configuration of the receiving antenna within locator 30. At the FLP, the flux lines of the locating field are characteristically vertically oriented. In the absence of skin depth compensation, when the locator is at the forward locate point, dipole transmitter 22 can appear deeper and shifted farther away from the locator at position B where the boring tool is shown in phantom.

Figure 4:
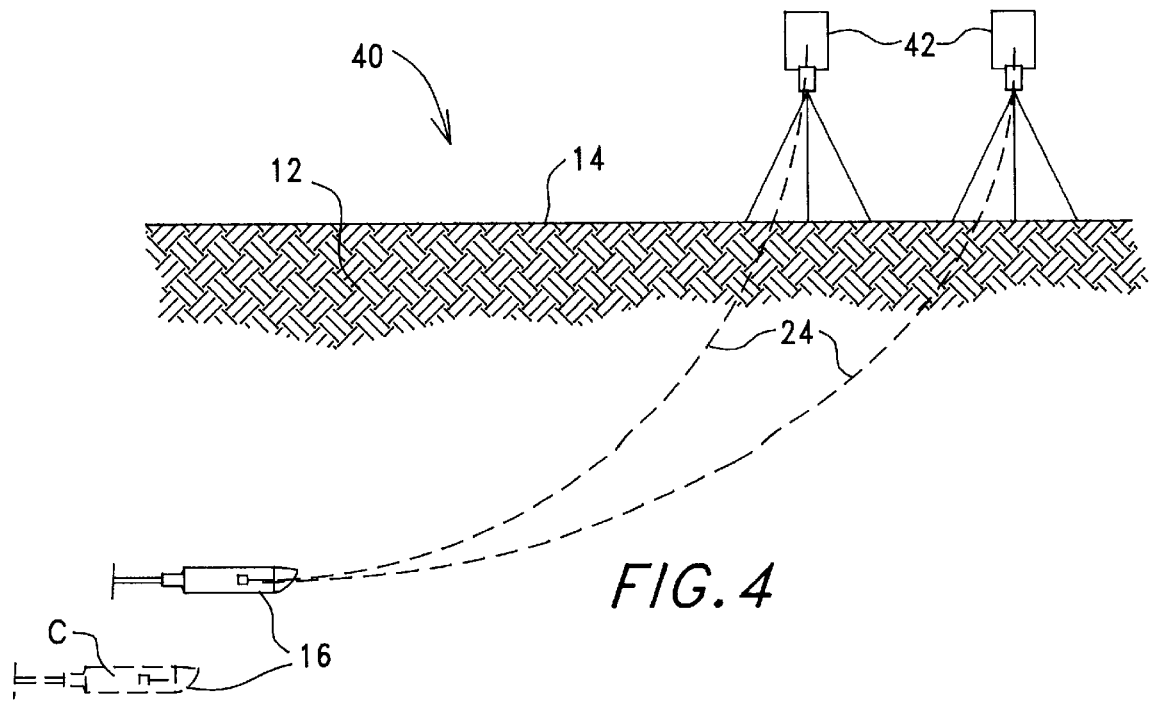
FIG. 4 is diagrammatic elevational view of still another horizontal drilling operation being performed in a region of ground using a locating/tracking system including fixed position above ground locating field detectors, shown here to illustrate the effects of skin depth on locating the boring tool in a system using such fixed position above ground locating field detectors.

U.S. patent application Ser. No. 08/835,834, now U.S. Pat. No. 6,035,951 filing date Apr. 16, 1997, entitled Systems, Arrangements and Associated Methods for Tracking and/or Guiding an Underground Boring Tool is commonly assigned with the present application and is incorporated herein by reference. One example of a highly advantageous locating/guidance system conforming with the subject application is shown in FIG. 4 and is generally indicated by the reference number 40. System 40 uses one or more above ground detectors 42 positionable at fixed locations within region 12 for reception of locating signal 24. With regard to the present application, skin depth produces an effect in system 40 which is similar to that described with reference to FIG. 3. That is, boring tool 16 appears (shown in phantom) to be at position C at a deeper depth and shifted away from detectors 42.

In some prior art systems, an above ground calibration procedure (not shown) is performed in an attempt to measure the signal strength of the dipole transmitter to be used in the boring tool with no consideration of the influence of skin effect. For example, the dipole transmitter and the locator are placed on the surface of the ground at a known separation and orientation. In this regard, it is recognized herein that skin depth has an effect on signal strength when such a calibration procedure is performed. Moreover, the skin effect in this above ground procedure varies from the skin effect encountered when the boring tool is beneath the surface, which further complicates provisions for skin depth compensation. The accuracy of skin depth obtained from an above ground calibration depends to a great extent on the homogeneity of the soil. Skin depth will be accurate if the conductivity of the soil near ground surface, where the calibration has been performed, is similar to that of the soil above the transmitter. Specifically, in the calibration procedure for ranges up to about three times skin depth, skin effect causes an increase in recorded strength of the transverse component of flux intensity and hence the distance between transmitter and receiver appears smaller while an opposite trend can be observed for the radial component of the flux intensity.

Having generally described the influence of skin depth, attention is now directed to details concerning provisions for effective compensation. The discussion immediately above, concerning an, above ground calibration procedure, evidences that each component of the magnetic flux intensity is affected differently by earth conductivity and dipole frequency. An exact solution, available for the components of magnetic flux intensity of a magnetic dipole immersed in homogenous earth (i.e., having ai uniform conductivity) of infinite extent is given in U.S. Pat. No. 4,710,708, issued to Rorden et al. Rorden, however, relies on the solution only to show that skin effect can be ignored when the range of interest is significantly less than the skin depth. Accordingly, Rorden uses a locating frequency that is low enough (generally 1–100 Hz) to produce a sufficiently high skin depth in equation 5 above to accomplish this objective. The present invention, however, considers the use of such low frequencies as unacceptable because common signal detection hardware and sensors such as coil loops are more sensitive at higher frequencies. Additionally, state of the art systems such as, for example, systems 10 and 40 described above contemplate the use of the locating signal as a carrier for the purpose of transmitting data to above ground locations wherein the data are encoded upon the locating signal. Carrier frequencies in the range of 1–100 Hz limit data transmission capabilities optimistically to rates in the range of only 0.5 to 50 Hz according to the Nyquist criteria.

Figure 5:
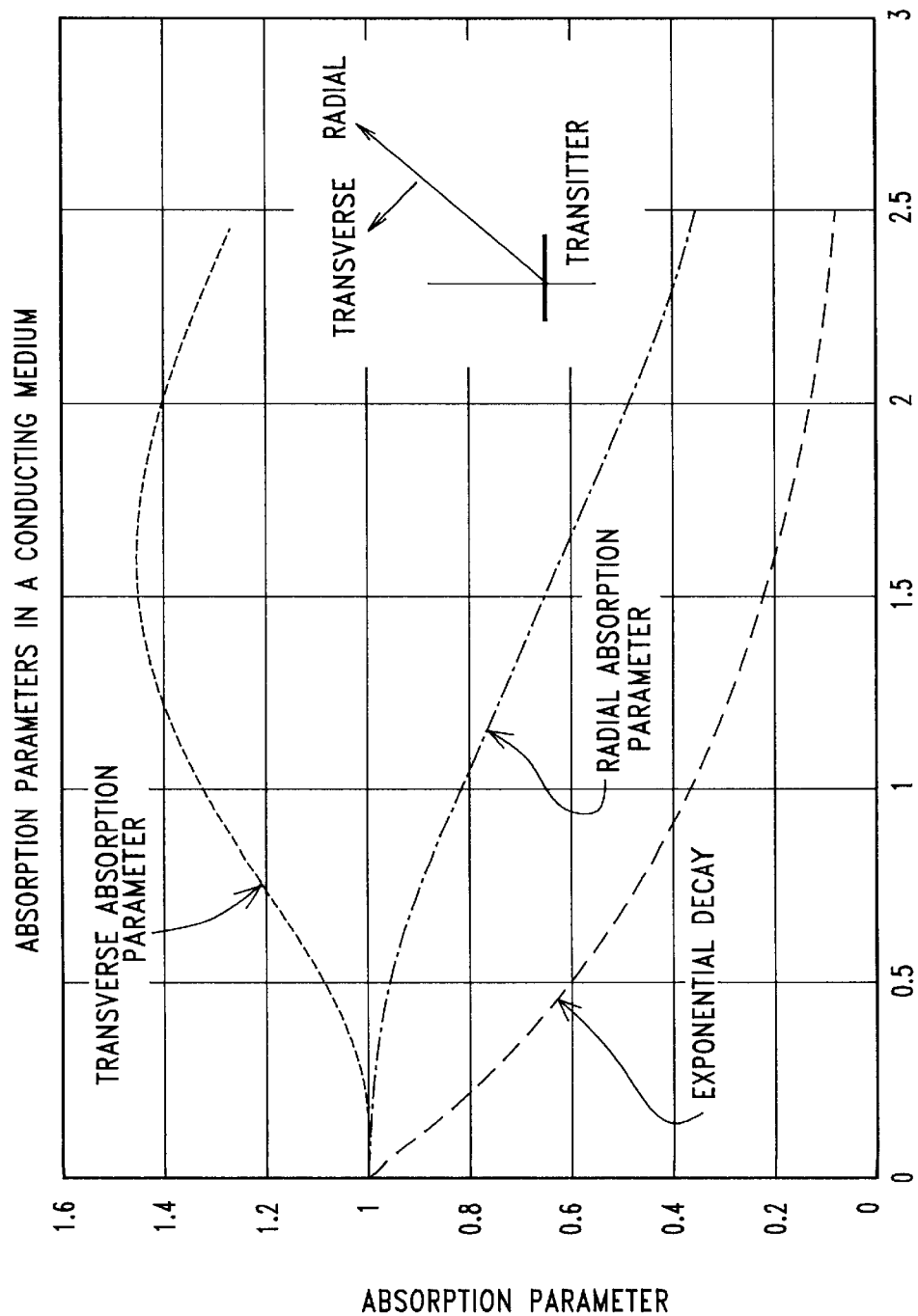
FIG. 5 is a plot of transverse and radial absorption parameters against the ratio of range to skin depth, shown here to illustrate the nature of these absorption parameters with increasing range to skin depth ratios.

Referring to FIG. 5, transverse and radial absorption parameters are shown plotted against the ratio of range, r, to skin depth, $\delta$, based on the Rorden expressions for these values. Exponential decay is shown for comparison. It is of interest here to note that Rorden fails to provide a plot such as that of FIG. 5 and, even though Rorden lists the equations, he fails to observe that the transverse and radial components are each affected in a different way as r/$\delta$ increases. Both components, however, approach exponential decay asymptotically for large values of r/$\delta$. At the same time, it is important to understand that the usefulness of the Rorden teachings is inherently limited, in a practical sense, because the presence of a ground surface is not modeled. As will be seen, the present invention resolves the difficulties in using locating signals having frequencies sufficiently high for providing ease of detection and adequate data transfer rates using the locating signal as a carrier while providing effective and highly advantageous compensation for skin effect, even though the locating frequencies used are high enough to encounter levels of skin effect that should not be ignored.

In one implementation of the present invention, which is applicable to essentially any underground boring system including systems 10 and 40 described above, the recognition must be emphasized that the locating field is governed by the cubic law of a magnetic dipole if the signal frequency goes to zero, because the skin depth goes to infmity regardless of the conductivity of the earth. At first blush, this recognition may seem of little importance to one of ordinary skill in the art since, as a practical matter, static magnetic fields (i.e., at zero frequency) are useless in the present application. That is, only a time varying field is readily measurable with sensitive detectors such as coils. However, the present invention overcomes the seeming uselessness of attempting a solution at zero frequency by providing a highly advantageous multi-frequency approach which allows the formulation of a zero frequency solution. Moreover, the multi-frequency approach taken by the present invention may readily be implemented using existing technologies, as will be seen immediately hereinafter.

The multi-frequency approach of the method of the present invention requires transmission and reception of the locating field using at least two different frequencies. While specific implementations to be described rely on the use of four different frequencies, it is to be understood that any number of frequencies of two or more may be employed. To some extent, it is considered that accuracy may be enhanced, however, when more than two frequencies are used. Details regarding frequency selection will be provided at an appropriate point below. In the four frequency implementation under discussion, measurement of the locating field is made at one or more above ground locations using either one or more detectors configured for use at fixed locations and/or using a portable walkover locator. Receivers in either a portable walkover locator or in fixed position above ground detectors may be configured in essentially the same manner, in accordance with these teachings. During operation of any system utilizing the multi-frequency approach of the present invention, measurements are made at the above ground locations corresponding to each of the selected frequencies. Thereafter, these measurements are utilized in a highly advantageous way which serves to extrapolate a zero frequency measurement. For example, it may be assumed for any particular above ground location that the component of the magnetic field intensity of the locating signal measured at the i-th frequency $f_i$ depends on skin depth according to:

$$S_i = S_0 F\left(\frac{D}{\delta_i}\right) \tag{6}$$

where $S_0$ is a constant which corresponds to the intensity of the locating field at zero frequency, $\delta_i$ is the skin depth at each of the selected frequencies, D is the depth or some characteristic length scale of the boring tool and F is a function to be determined. Thus, the objective is to establish the value of $S_0$ based on the values $S_i$. To that end, for each of the selected frequencies, an interpolation polynomial or any other suitable mathematical function including an exact solution, if obtainable, may be used to provide a curve fit to the measured data for each of the frequencies. As an example, a cubic polynomial can be used to approximate the function, F, at the four required frequencies. Introducing the definition of skin depth, the magnetic field intensities can be written as:

$$S_1 = S_0 + af_1^{0.5} + bf_1 + cf_1^{1.5} \tag{7}$$

$$S_2 = S_0 + af_2^{0.5} + bf_2 + cf_2^{1.5} \tag{8}$$

$$S_3 = S_0 + af_3^{0.5} + bf_3 + Cf_3^{1.5} \tag{9}$$

$$S_4 = S_0 + af_4^{0.5} + bf_4 + Cf_4^{1.5} \tag{10}$$

Equations 7–10 are a set of linear equations for the unknown coefficients $S_0$, a, b and c that can be solved employing standard solution methods. It should be noted that this approach is very efficient numerically, requiring a small matrix to be inverted with coefficients depending on the chosen frequencies. Once a value for $S_0$ is obtained, the position of the boring tool can be determined using the well known cubic equations 1–4 above. Remarkably, there is no need to determine the skin depth values $\delta_i$. Since the selected frequencies are chosen prior to initiation of drilling, the inversion of this matrix need only be performed once. Other formulations of signal strength at each frequency, $S_i$, may be used. For example, one possible formulation may be based on the exact solution of Rorden in which exponential decay is observed for large values of r/δ, the equations may be expressed in the form:

$$S_i = S_0 e^{-\frac{r}{\delta_i}} G\left(\frac{r}{\delta_i}\right) \tag{11}$$

$$S_i = e^{-cf_i^{0.5}}(S_0 + af_i^{0.5} + bf_i) \tag{12}$$

where G is a function to be determined and all other values are described above. It should be noted that this approximation also requires measurements at four frequencies but the four resulting equations for unknown coefficients $S_0$, a, b, c are nonlinear. Hence, the solution method is somewhat less efficient than one based on polynomial approximations, but remains applicable over a wider range of skin depth. Once again, there is no need to determine the values $\delta_i$.

Figure 6:
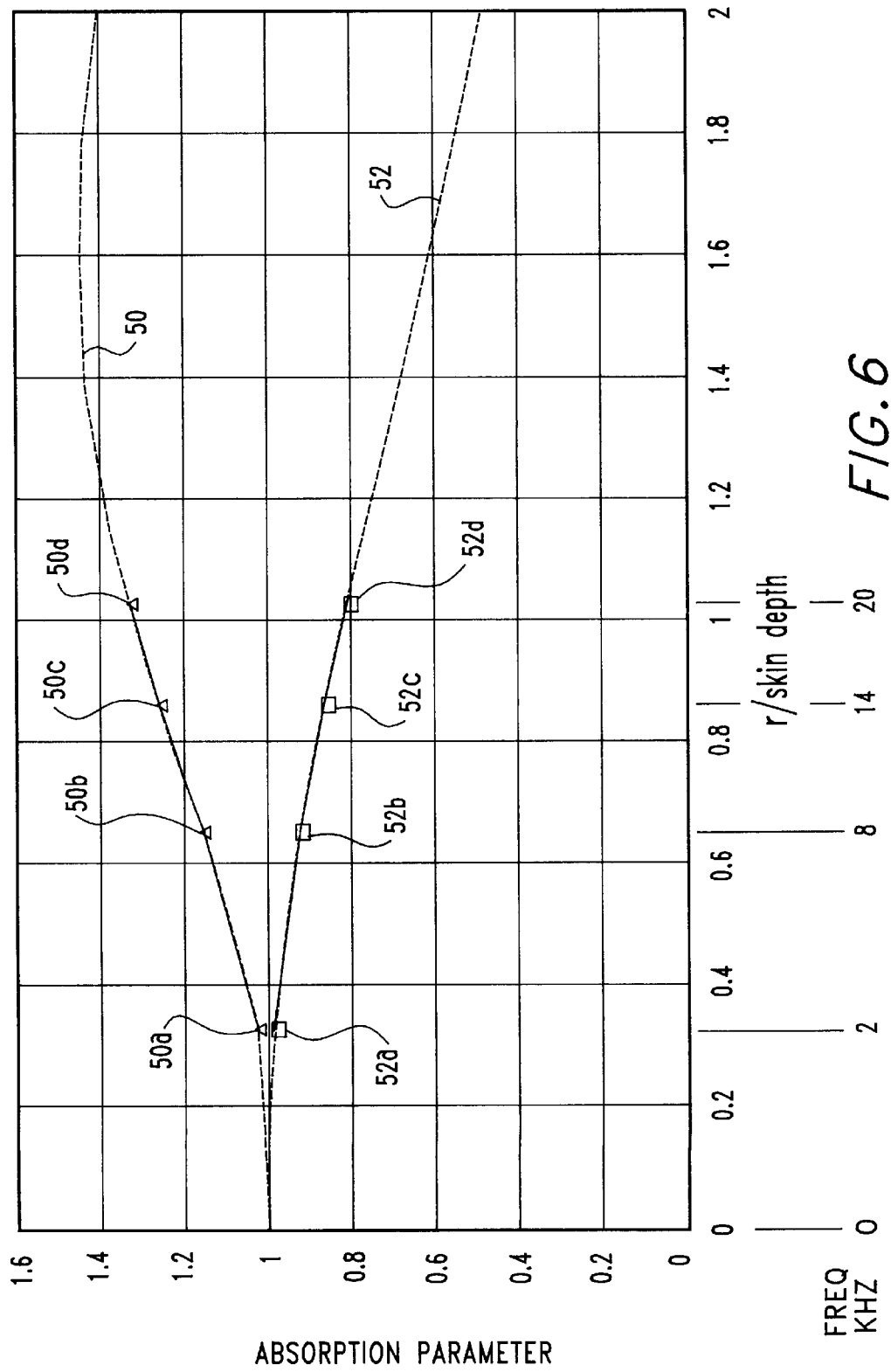
FIG. 6 is a plot of absorption parameters versus the ratio of range to skin depth for rich agricultural earth extending to infinity in all directions, shown here to illustrate selected points on the absorption parameters for use in validating the multi-frequency approach of the present invention.

Referring to FIG. 6, an important feature of the multiple frequency approach of the method of the present invention resides in the fact that it does not require knowledge of earth properties or ground surface geometry. The components of the magnetic field measured at nonzero frequencies contain property and geometry effects and pass them on to extrapolated zero frequency values. FIG. 6 demonstrates the validity of this approach for a simplified case, rich agricultural earth (i.e., meaning higher conductivity soil) extending to infinity in all directions. In this example, any variations of earth conductivity and the effect of ground surface and air on the magnetic field are neglected. The transverse and radial absorption parameters, representing the deviation of the magnetic field from the cubic law of magnetic dipoles, are plotted vertically against the ratio of range to skin depth as dashed lines indicated by the reference numbers 50 and 52, respectively. Points 50a–d and 52a–d have been selected on each absorption parameter curve corresponding to transmitter frequencies of 2, 8, 14 and 20 kHz, respectively. As seen, extrapolation of the curve using the polynomial formulation of equations 7–10 provides magnetic field data that are within 2% of known exact values for the absorption parameters at zero frequency (i.e., the known value of 1.0 for both of the absorption parameters at zero frequency). In the method of the present invention, the extrapolation is performed for magnetic intensity, however, the present example serves to illustrate the validity of this approach even though the absorption parameters were extrapolated since magnetic intensity is the product of the cubic law and absorption parameter. Even though the discussion dealt with distributed conductivity of soil, the multiple frequency approach will work for other field distortions due to conductivity including but not limited to buried electrical conductors, pipes, plates and rebar.

With regard to selection of frequencies at which the locating signal is to be transmitted, it is noted that an unlimited number of different frequency combinations may be employed. Since an extrapolation to zero frequency is being performed, however, it is considered that the frequencies should be as low as possible while still providing for adequate detection and transmission of data, using the locating signal as a carrier. For example, frequencies in the range of 2–40 kHz are considered as acceptable.

Figure 7:
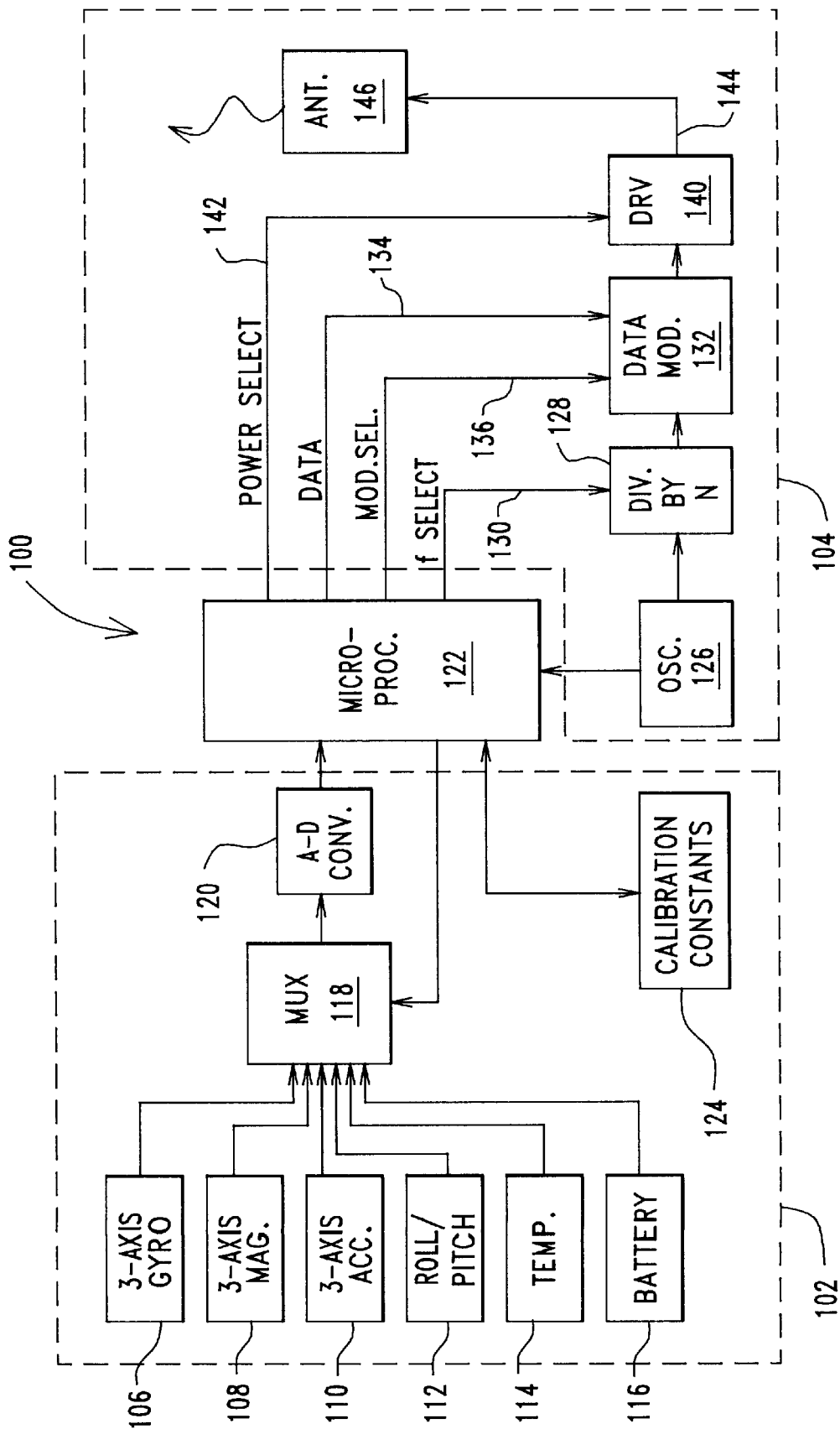
FIG. 7 is a block diagram illustrating a multi-frequency transmitter manufactured in accordance with the present invention and suitable for use in a boring tool.

Referring now to FIG. 7, having described the multi-frequency approach of the method of the present invention, descriptions will now be provided of components appropriate for use in systems which utilize the approach. FIG. 7 illustrates a multi-frequency transmitter manufactured in accordance with the present invention and generally indicated by the reference number 100. Transmitter 100 includes a sensor/conditioning section 102 and a carrier generation/antenna drive section 104. Transmitter 100 is generally configured for use in a boring tool, in certain instances, the transmitter may be used in above ground applications such as, for example, in a calibration and/or system test unit (not shown).

Still referring to FIG. 7, sensor/conditioning section 102 includes a suitable group of sensors in this instance comprising, for example, a three-axis gyro 106, a three-axis magnetometer 108, a three-axis accelerometer 110, a roll/pitch sensor 112, a temperature sensor 114 and a battery sensing section 116. Physical parameters at the outputs of magnetometer 108, accelerometer 110 and roll/pitch sensor 112, as well as the transmitter battery conditions using battery sensing section 116 and temperature using temperature sensor 114, are provided to a multiplexer 118 which then transfers all of these signals in multiplexed form to an analog to digital converter 120. The latter digitizes and converts the multiplexed signals into digital format, for example, at either an 8-bit or 12-bit resolution, depending on accuracy requirements. Thereafter, a microprocessor 122 processes all of the parameters provided from the analog to digital converter and converts the parameters into information relating to the in-ground transmitter coordinates or relating to down-hole conditions. For example, during this parameter processing, the microprocessor may perform linearization and temperature compensation on the output of roll/pitch sensor 112 in order to calculate an absolute pitch position of the boring tool. The pitch output may further be compensated based on the determination of a particular roll position. Linearization and compensation coefficients are generated during factory calibration and stored in a calibration constant section 124 which comprises a non-volatile memory area within transmitter 100. It is noted that programming of microprocessor 122 is considered to be within the ability of one having ordinary skill in the art in view of this overall disclosure.

Once the calculations are complete relating to all of the signals from sensors in sensor/conditioning section 102, the results are transmitted to one or more above ground locations. To that end, carrier generation/antenna drive section 104 includes an oscillator 126 which provides a clock signal to microprocessor 122 and to a divide by N counter 128. The latter receives a frequency select input from microprocessor 122 on an f select line 130 such that the divide by N counter may selectively generate any one of a wide range of carrier frequencies. The carrier frequency may be selected by microprocessor 122 under software control in a number of different ways. In one configuration, frequency selection can be performed at the beginning of the drilling operation, for example, after monitoring of background noise levels at various frequencies such that noisy frequencies may be avoided. Such noisy frequencies may be attributed, for instance, to traffic loops, invisible dog fences, cable TV, and power lines in a particular region. In another configuration, the transmitter may change frequencies on the fly, after the drilling has started. On the fly frequency change can be initiated either by the microprocessor using a predetermined algorithm, or by the request of the drilling operator, for example, using a signal transmitted by telemetry from the surface to the boring tool or transmitted through the drill string using an isolated electrical conductor or based on possibilities such as, for example, boring tool roll orientation sequence and roll Irate. Particularly advantageous arrangements for automatically forming an isolated electrically conductive path between the drill rig and an in-ground device such as a boring tool to provide power and signal paths are disclosed in co-pending U.S. patent application Ser. No. 09/317,308, filing date May 24, 1999 which is incorporated herein by reference.

The selected carrier frequency is then passed to a modulation section 132 which is configured for modulating data from sensor/conditioning section 102 onto the selected carrier frequency. Modulation section 132 receives the data on a data line 134 from microprocessor 122 and also receives a modulation selection signal on a mod select line 136 connected with the microprocessor. The modulation selection signal may select, for example, phase modulation or amplitude modulation, or combinations of both. The modulation scheme may be programmed either before or during the drill, much in the same manner as in the case of the carrier frequency, described above.

With continuing reference to FIG. 7, data modulation section 132 passes a modulated carrier signal to a driver section 140. The driver section receives a power selection input on a power select line 142 from microprocessor 122. In this way, the output of transmitter 100 may be tailored to drilling conditions, for example, to conserve battery power in a shallow drill run or to increase transmitter output at longer ranges and/or drilling depths or even to stop transmission altogether during idle periods of a drilling operation. Control of the power as well as other functions can be achieved using procedures such as have been described for frequency control. The transmitter can send encoded data (as is done for roll, pitch and other parameters) to allow the receiver to adjust its calibration for the new signal strength. This will allow the operator to continue monitoring depth or range without the need to recalibrate while drilling. An antenna drive signal is produced on an antenna line 144 which is coupled to an antenna 146 which generally comprises a dipole antenna for emanation of locating signal 24.

In accordance with the multi-frequency approach of the present invention, described above, transmitter 100 may alternately transmit one of four selected carrier frequencies from the boring tool. The carrier frequencies may alternate at any suitable rate such as, for example, 10 Hz and may be selected in accordance with considerations described previously. It should be appreciated that transmitter 100 is configured for flexibility in carrying out the method of the present invention. That is, fewer or more than four carrier frequencies may readily be transmitted either individually or simultaneously.

Figure 8:
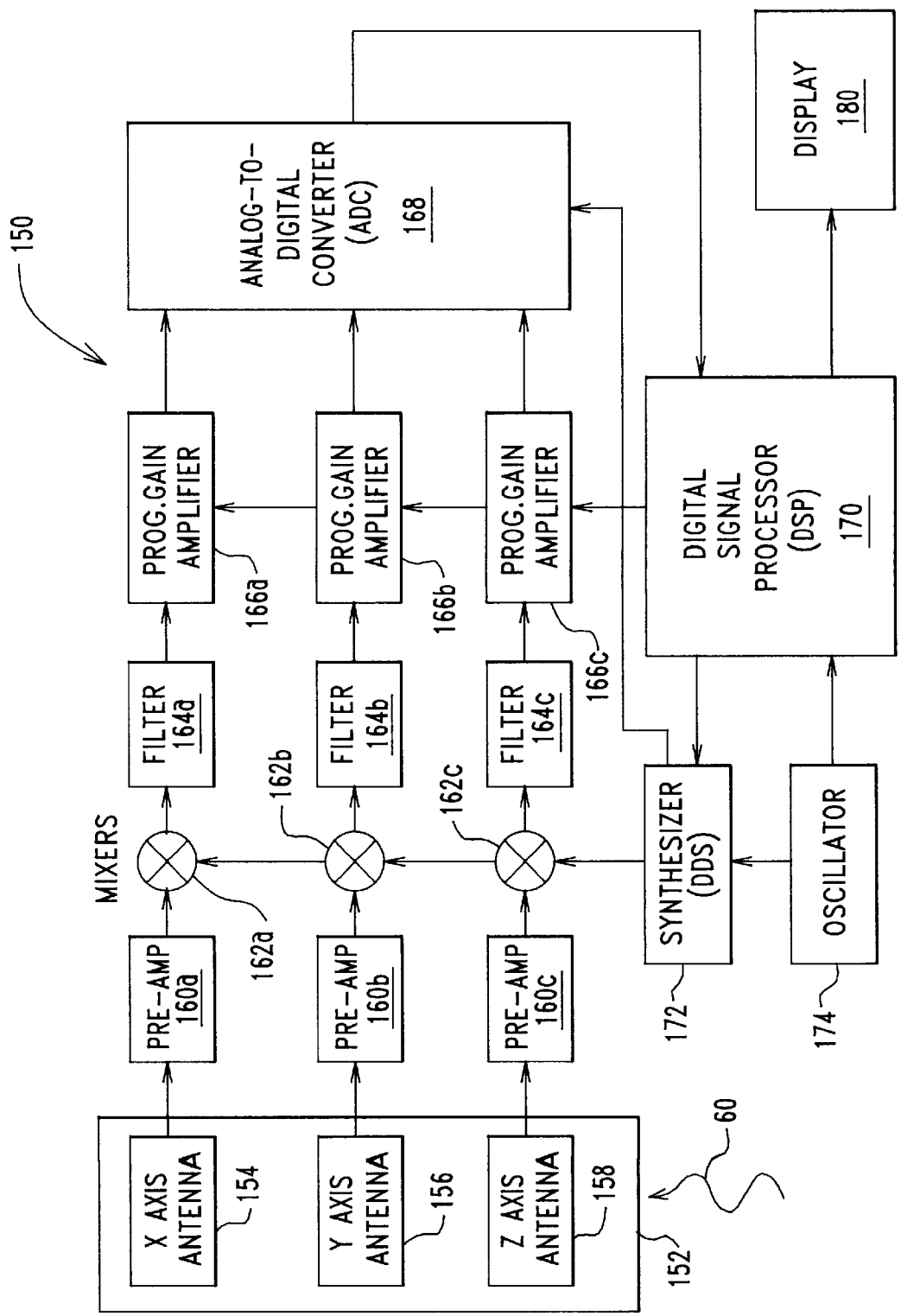
FIG. 8 is a block diagram illustrating a multi-frequency receiver manufactured in accordance with the present invention and suitable for use in a portable walkover detector or fixed position detector.

Turning now to FIG. 8, a multi-frequency receiver manufactured in accordance with the present invention is generally indicated by the reference number 150. Locating signal 60 is received by an antenna arrangement 152 which may include three orthogonally arranged x, y and z antennas indicted by reference numbers 154, 156 and 158, respectively. The locating signal received by each antenna is first amplified by respective very low noise pre-amplifiers 160*a*–*c* prior to processing. This pre-amplification maintains the received signal-to-noise ratio while making any noise introduced by subsequent circuitry relatively negligible. The amplified antenna signals (not shown) are then fed to mixers 162a–c to be translated down to a lower intermediate frequency (IF). In this manner, any locating signal frequency within a suitable design range such as, for example, 2–40 kHz can be received through appropriate adjustment of the frequencies of the mixers such that outputs of the mixers fall within a selected IF band.

Still referring to FIG. 8, the mixers are followed immediately by narrow-band, band-pass filters 164a–c which essentiay pass only the locating signals at the translated IF frequency. The IF frequency can be either the sum or the difference of the carrier frequency and the mixer frequency. The filtered x, y and z signals are further amplified by programmable-gain amplifiers (PGA's) 166a–c before being received by an analog-to-digital converter 168. PGA's 166 provide over 96 dB of dynamic range and are each diretly controlled by a digital signal processor (DSP) 170. One suitable DSP is the ADSP2185L, a sixteen bit fixed point DSP manufactured by Analog Devices, Inc. Analog-to-digital converter (ADC) 168 digitizes the received signals, at a rate controlled by a direct digital synthesizer (DDS) 172 which is, in turn controlled by DSP 170. The DSP and DDS receive an oscillator signal from an oscillator 174. Using the oscillator signal and based on control from the DSP, the DDS generates a local oscillator frequency (LO) for mixers 162. The ADC digitizes the received signals at the rate determined by the DDS and converts the signals to a binary number two's complement format. The conversion rate is either four times the IF frequency, if a quadrature sampling scheme is used, or may be significantly less than the IF requency, if an under-sampling scheme is chosen. The resolution of the ADC may be 12-bit to 16-bit. AU axes are simultaneously sampled in order to maintain relative phase.

Continuing to describe receiver 150, digital signal processor DSP 170, controls all operations of the receiver including mixing frequency, PGA gain, and a selected signal processing algorithm. In the case of a quadrature sampling scheme, the DSP samples the received signals at four times their IF (translated) frequency and then multiples the received signals it by a separate Sine and Cosine sequence to obtain in-phase and quadrature-phase components. This process converts the received signal from its IF frequency down to a base-band frequency that contains modulated data, if present, while, at the same time, breaks down the signal into its in-phase (I) and quadrature-phase (Q) components. The I and Q components are each passed through a simple low-pass filter (not shown) to remove everything but the modulated data. The filtered outputs are then used to obtain the original data as well as further processing to recover signal magnitude and sign information. Additionally, the outputs are also used, along with a modified phase-lock-loop technique known as Costas loop, for controlling the DDS frequency (which controls the mixer frequency and ADC sample rate) and the PGA gain settings. The exact algorithm varies depending on the modulation scheme used but may be developed by one having ordinary skill in the art in view of this overall disclosure.

If under sampling (not shown) is used, the DSP would sample the received signals at a rate much lower than the IF frequency. The digitized data is then processed using a matched filter to obtain data, magnitude, and sign information as well as for PGA gain control. Irrespective of sampling, the DSP implementation is considered to be highly advantageous, resulting in a very flexible and adaptive multi-frequency receiver. Many modifications (not shown) are possible in view of this disclosure for purposes of performance improvement. For example, mixers 162 can be eliminated by replacing narrow-band band-pass filters 164 with broadband band-pass filters and using ADC 168 to perform quadrature sampling and direct-to-base-band conversion (digital mixing) in a single operation. In order to receive the locating signal at different frequencies, DSP 170 may either sample the data at different rates or sample everything at a single, fixed rate and then perform rate conversion in software using decimation and interpolation techniques (known as digital re-sampling). As mentioned previously, it should be appreciated that receiver 150 may readily be incorporated into either a portable walkover locator or into detectors designed for use at fixed positions with a drilling region.

Having described a highly advantageous multi-frequency approach for use in skin depth compensation, skin depth compensation techniques using a single frequency locating signal will now be described with regard to a number of different exemplary scenarios. It is to be understood that existing systems using portable locators may readily be adapted in conformity with these teachings or, alternatively, new systems using either a portable locator and/or one or more locating field detectors designed for positioning at fixed locations within a drilling region are also readily adaptable in view of these teachings.

Figure 9:
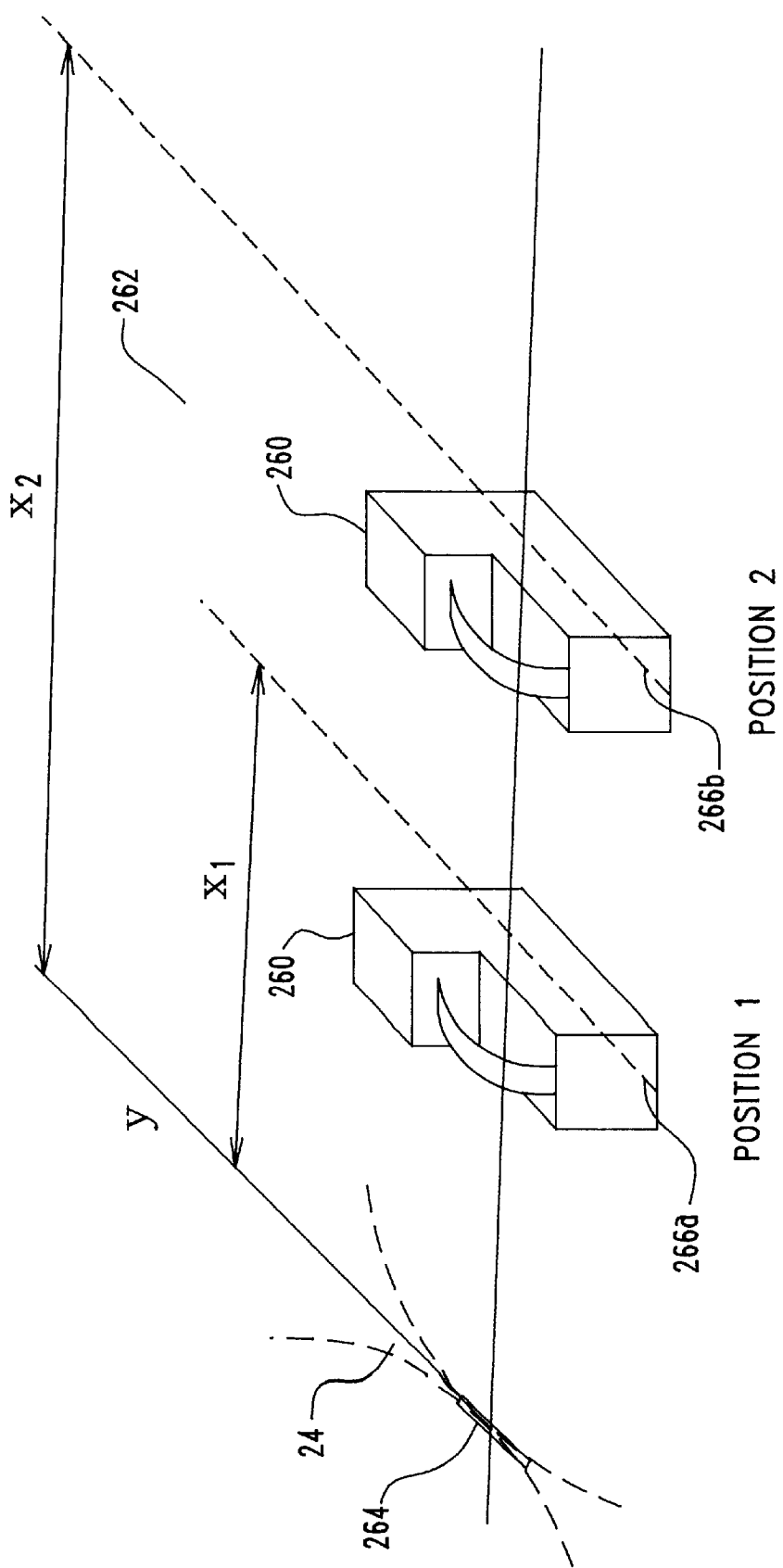
FIG. 9 is a perspective view of the surface of the ground on which a calibration procedure is being performed for determination of skin depth in accordance with the present invention using a portable walkover detector.

Referring now to FIG. 9, the techniques disclosed herein for use with single frequency locating signal transmission initially rely on a determination of the skin depth in the drilling region. As mentioned previously, some prior art systems utilize an above ground calibration procedure in an attempt to relate the signal strength of a dipole transmitter to distance without skin depth compensation. The present invention introduces a technique for performing an above ground calibration procedure which not only provides dipole signal strength, but also yields a value for skin depth in the drilling region which may be used in subsequent position determination techniques accounting for skin depth. FIG. 9 illustrates a calibration procedure being performed using a portable walkover detector 260 in a region 262. The calibration procedure is performed on the surface of the ground which is assumed to be planar for purposes of simplicity, having x and y coordinate axes defined as shown. A dipole transmitter 264 is diagrammatically illustrated and is oriented along the y axis while being centered upon the x axis. Preferably, the transmitter should be the transmitter which is to be used during subsequent drilling operations in a drilling configuration such as housed in the drill head (not shown) placed on the surface of the ground. Alternatively, the transmitter itself may be positioned on the ground, but it must be remembered that measurements are likely to be affected by any housing later positioned around the transmitter.

Still referring to FIG. 9, the calibration procedure is performed with the walkover locator at twvo offset positions along the x axis indicated by the reference numbers 266a, corresponding to an offset distance of x1, and 266b, corresponding to an offset distance of x2. Transmitter 264 transmits locating signal 24 at a single frequency. It is to be understood that the calibration procedure may just as readily be performed using a detector which is intended for location at a fixed position within the drilling region following the calibration procedure. In this regard, irrespective of the specific form of the detector instrument to be used in the calibration procedure, the instrument should be positioned such that its locating field sensor arrangement is on the x axis. In the instance of a walkover locator having an antenna configuration as described, for example, in above referenced U.S. Pat. No. 5,337,002, which is commonly assigned with the present application, the plane of the antenna arrangement should be aligned parallel to the y axis of the transmitter. In the instance of a locating field detector including three orthogonal receiving axes, such as described in above incorporated U.S. application Ser. No. 08/835,834, the detector arrangement is somewhat arbitrary since signals measured along the three axes can be transformed mathematically into any desired directions.

Using the configuration shown in FIG. 9, the calibration procedure is performed by measuring the components of the magnetic flux intensity $B_{y1}$, and $B_{y2}$ at positions $x_1$ and $x_2$, respectively. Geophysical theory provides an equation for the calculation of dipole strength and skin depth that has the general form:

$$B_y = B_y(x, y, m, \delta) \tag{13}$$

where $B_y$ is a measured intensity, x and y are the coordinates of the locator/detector, m is the signal strength of the dipole transmitter and $\delta$ is the skin depth. At this time, a preferred method is based on the theory of Wait et al (Journal of Geophysical Research, Vol. 58, No. 2) which is valid for zero transmitter pitch, level ground surface and homogeneous soil conditions, as are present in FIG. 7. Wait solvies Maxwell's equations with boundary conditions at the ground surface correctly satisfied. Since the calibration procedure provides two values of magnetic flux intensity and the distances $x_1$ and $x_2$, two nonlinear equations for calculating m and $\delta$ are obtained:

$$B_{y1} = B_y(x_1, 0, m, \delta) \tag{14}$$

$$B_{y2} = B_y(x_2, 0, m, \delta) \tag{15}$$

Figure 10:
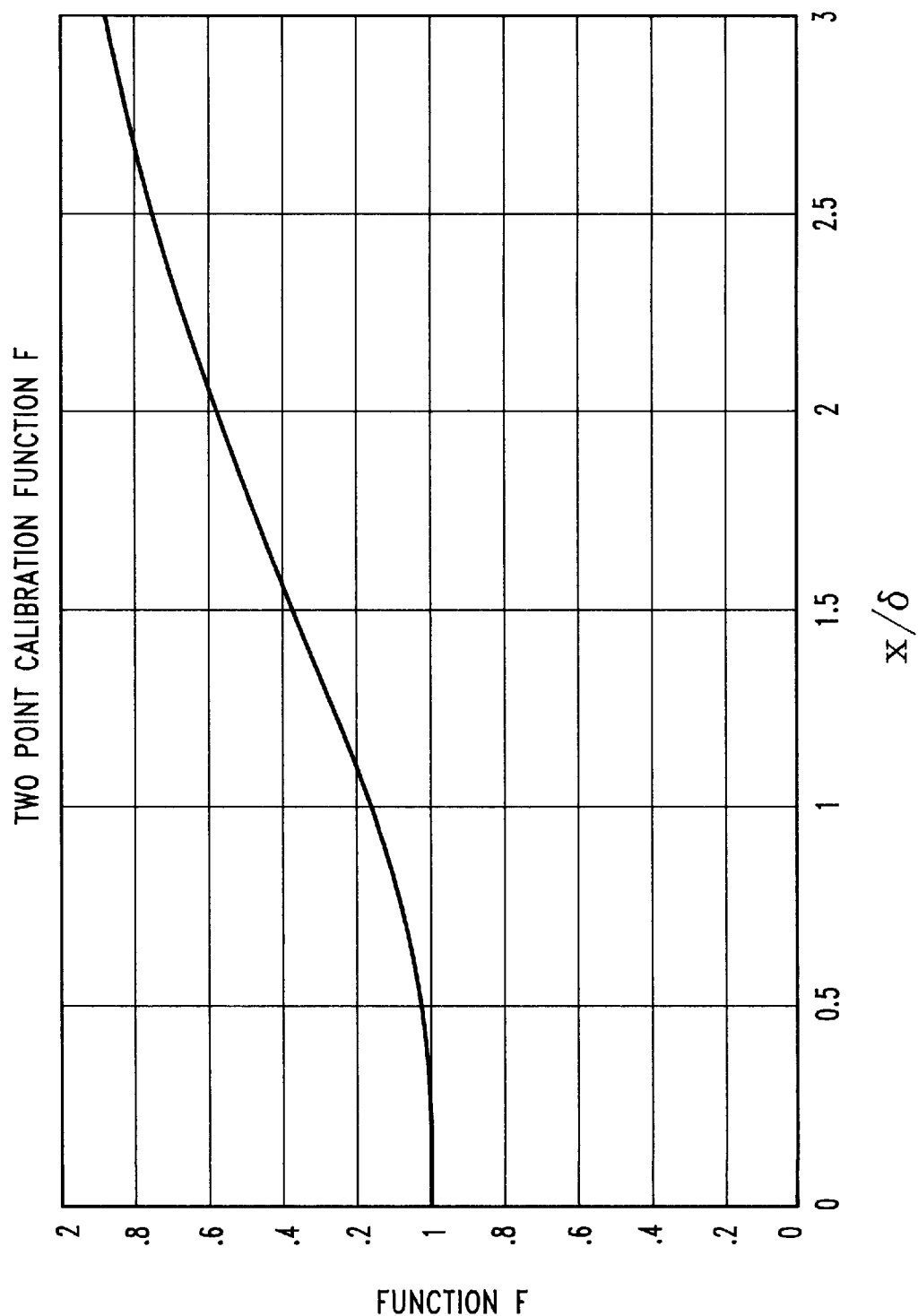
FIG. 10 is a plot illustrating a two point calibration function F.

The deviation of $B_y$ from the cubic law is approximated in the range $0 <= x/\delta < 3$ by:

$$B_y = \frac{m}{x^3} F\left(\frac{x}{\delta}\right), \text{ and} \tag{16}$$

$$F\left(\frac{x}{\delta}\right) = 1 + b\frac{x}{\delta} + c\left(\frac{x}{\delta}\right)^2 + d\left(\frac{x}{\delta}\right)^3 \tag{17}$$

where the function F is shown in FIG. 10. The unknown coefficients b, c and d can be obtained from this graph using standard numerical techniques.

Using equations 16 and 17, the following equations can be obtained which can be solved for m and $\delta$:

$$B_{y1} = \frac{m}{x_1^3}\left[1 + b\frac{x_1}{\delta} + c\left(\frac{x_1}{\delta}\right)^2 + d\left(\frac{x_1}{\delta}\right)^3\right] \tag{18}$$

$$B_{y2} = \frac{m}{x_2^3}\left[1 + b\frac{x_2}{\delta} + c\left(\frac{x_2}{\delta}\right)^2 + d\left(\frac{x_2}{\delta}\right)^3\right] \tag{19}$$

The solution is obtained in 2 steps. First, the following variables are defined after introduction in equations 18 and 19:

$$g_1 = B_{y1} x_1^3 \tag{20}$$

$$g_2 = B_{y2} x_2^3 \tag{21}$$

$$\varepsilon = \frac{1}{\delta} \tag{22}$$

Subtracting equation 19 from equation 18 provides equation 23 for $\epsilon$.

$$(g_1 x_2^3 - g_2 x_1^3)d\epsilon^3 + (g_1 x_2^2 - g_2 x_1^2)c\epsilon^2 + (g_1 x_2 - g_2 x_1)b\epsilon + g_1 - g_2 = 0 \tag{23}$$

Equation 23 can be solved employing a standard method such as Newton's to yield $\delta$. Thereafter, dipole strength, m, follows directly from:

$$m = \frac{B_{y1} x_1^3}{1 + b\frac{x_1}{\delta} + c\left(\frac{x_1}{\delta}\right)^2 + d\left(\frac{x_1}{\delta}\right)^3} \tag{24}$$

Thus, dipole signal strength, m, and skin depth, $\delta$, are established for use in subsequent position determinations.

Figure 11:
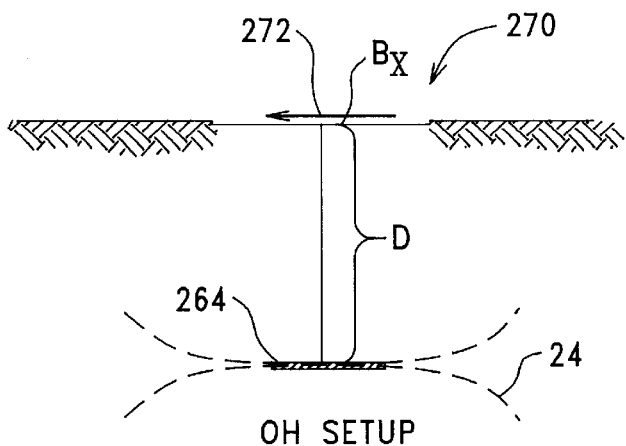
FIG. 11 is a diagrammatic elevational view of an overhead position determination setup, illustrating the determination of a skin depth corrected depth of the boring tool.

Turning now to FIG. 11, in a first scenario, an overhead position determination setup (hereinafter OH setup) is generally referred to by the reference number 270 with a detector (not shown) at a position 272 located directly overhead (hereinafter OH setup) of transmitter 264 transmitting locating signal 24. At this location, the flux lines of the magnetic locating field are characteristically horizontal substantially over the transmitter. The detector measures the horizontal component of the magnetic flux intensity $B_x$. With m and $\delta$ known from the foregoing above ground calibration transmitter depth and with a measured value of intensity, $B_{xD}$, from the detector, D, is determined from a single equation written symbolically as:

$$B_{xD} = B_x\left(m, D, \frac{D}{\delta}\right) \tag{25}$$

The exact form of equation 25 can either be obtained from geophysical theory or from dimensional analysis. Applying the latter (e.g., P. W. Bridgman, Dimensional Analysis, 1931) six variables are identified governing the physics of OH setup depth measurement. The variables include $B_x$, $\mu$, $\sigma$, f, D and m which have been defined previously. Furthermore, four fumdamental units including length, time, volt, and ampere characterize the problem. Hence according to the $\pi$-theorem of dimensional analysis six minus four or two non-dimensional groups describe the OH setup measurements mathematically. The two non-dimensional groups include $$\frac{B_x D^3}{m} \tag{26}$$

Figure 12:
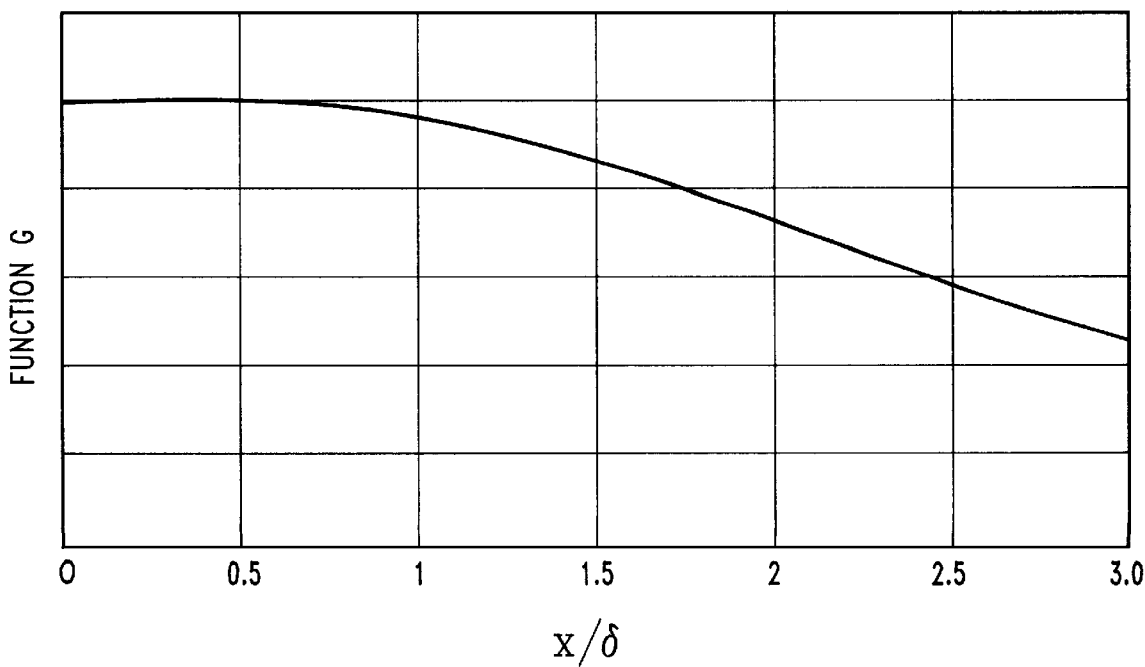
FIG. 12 is a plot representing the deviation from the cubic law obtained from a curve fit of Wait's theoretical results valid for a semi-infinite conductive region and zero transmitter pitch in the range $0 \leq D/\delta < 3$.

The second group given by equation 27 can be simplified to D/$\delta$ using the definition of skin depth from equation 5. Hence $B_x$ must be of the following general form:

Here, the function G represents the deviation from the cubic law obtained from a curve fit of Wait's theoretical results valid for a semi-infinite conductive and zero transmitter pitch in the range $0 \leq D/\delta < 3$ medium, shown in FIG. 12. Since this equation is nonlinear for depth D, an iterative procedure must be formulated. As one example:

$$B_x = \frac{m}{D^3} G\left(\frac{D}{\delta}\right) \tag{28}$$

$$D = \left(\frac{m}{B_x} G\left(\frac{D}{\delta}\right)\right)^{\frac{1}{3}} \tag{29}$$

Function iteration/successive approximation is performed beginning with an initial guess for D, e.g. the value corresponding to infinite skin depth. In successive approximations, the procedure inserts the last available value for D on the right hand side of this equation thereby calculating a new, more accurate value. This process is repeated until changes between successive values of D are reduced to a specified tolerance.

The analysis outlined immediately above provides the correct functional relation between variables governing OH setup depth measurement which can be written as:

$$G\left(\frac{D}{\delta}\right) = \sum_{i=1}^{N} c_i \left(\frac{D}{\delta}\right)^{d_i} \quad (30)$$

The unknown coefficients $c_i$ and $d_i$ must be obtained from another source, for example, Wait's theory or a physical experiment conducted in different soil conditions and at various depths. Another method for obtaining these coefficients relies entirely on numerical modeling solving Maxwell's equations and pertinent boundary conditions. Computer codes are commercially available to aid in this task such as, for example, software by Infolytica Corporation in Montreal, Canada.

Figure 13:
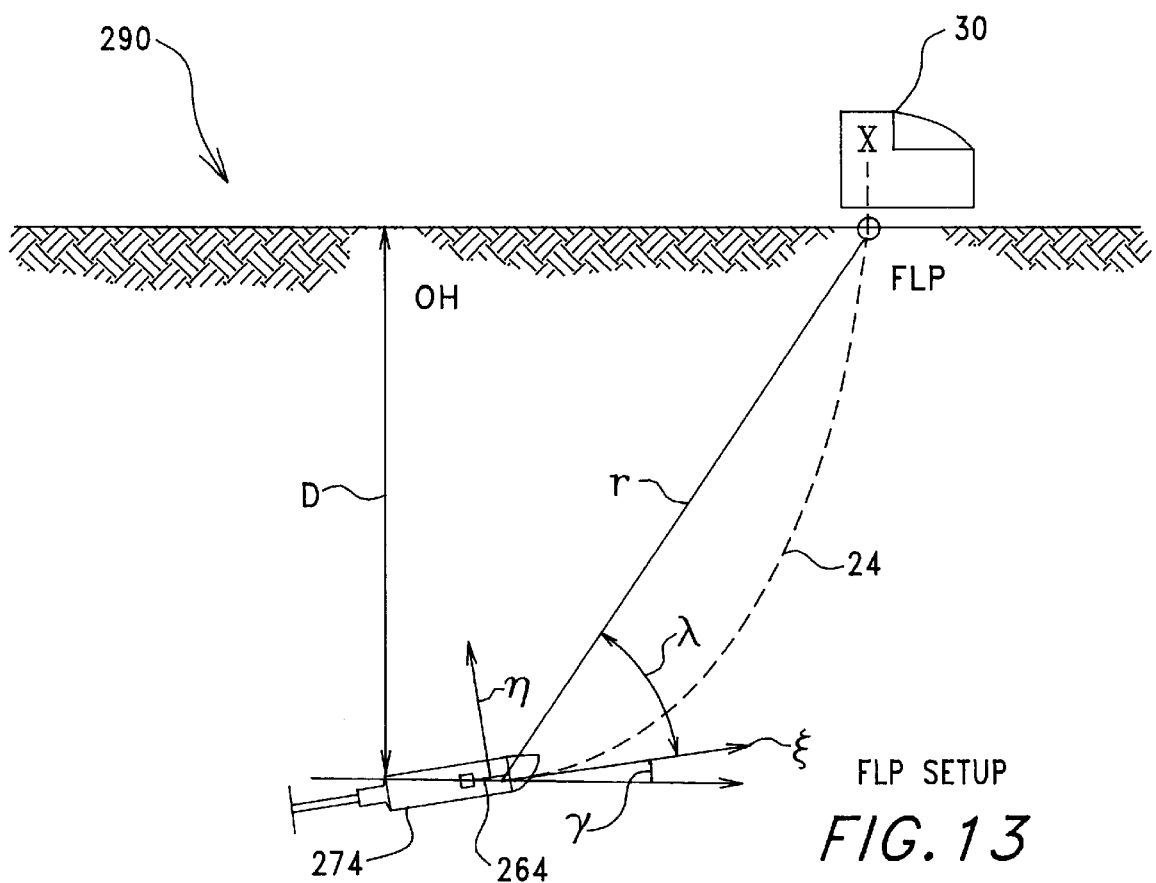
FIG. 13 is a diagrammatic elevational view of a forward locate position determination setup, shown here to illustrate determination of a skin depth corrected depth of the boring tool from the forward locate point.

Attention is now directed to FIG. 13 which illustrates a second scenario representing a Forward Locate Point position determination setup generally indicated by the reference numeral 290. It should be mentioned that even though the present discussions are made with reference to the forward locate point, these concepts are equally applicable to the rear locate point. In this instance, detector 30 measures the magnitude of the magnetic flux intensity B (not shown) as a result of locating signal 24 transmitted from transmitter 264 within drill head 274. In addition, transmitter pitch $\gamma$ is measured. In order to calculate transmitter depth from these measured quantities the following equations must be solved:

$$B_\xi = B_\xi\left(\xi, \eta, \frac{r}{\delta}\right) \quad (31)$$

$$B_\eta = B_\eta\left(\xi, \eta, \frac{r}{\delta}\right) \quad (32)$$

$$\tan\gamma = \frac{B_\xi}{B_\eta} \quad (33)$$

$$D = r\sin(\lambda + \gamma) \quad (34)$$

$$B_y = \sqrt{B_\xi^2 + B_\eta^2} \quad (35)$$

$$\tan\lambda = \frac{\xi}{\eta} \quad (36)$$

$$r^2 = \xi^2 + \eta^2 \quad (37)$$

The definitions of the geometric variables $D$, $r$, $\xi$, $\eta$, $\lambda$ are given in FIG. 13. It is noted that transmitter depth is the distance from the ground surface to the transmitter. Since the locator antennas measure signals above ground, the distance between the antennas and ground must be subtracted from the computed depth. These variables and the two components of the magnetic field intensity $B_\xi$ and $B_\eta$ make up a total of 7 unknowns that can be obtained from the listed seven equations using standard numerical methods. An example of a convenient solution method is to rewrite the equations in terms of polar coordinates $r$, $\lambda$ using $$\xi = r\cos\lambda \quad (38)$$

$$\eta = r\sin\lambda \quad (39)$$

This transformation eliminates two equations. The remaining equations then read:

$$B_\xi = B_\xi\left(r, \lambda, \frac{r}{\delta}\right) = \frac{3\cos^2\lambda - 1}{r^3} H_1\left(\frac{r}{\delta}\right) \quad (40)$$

$$B_\eta = B_\eta\left(r, \lambda, \frac{r}{\delta}\right) = \frac{3\sin\lambda\cos\lambda}{r^3} H_2\left(\frac{r}{\delta}\right) \quad (41)$$

$$\tan\gamma = \frac{B_\xi}{B_\eta} \quad (42)$$

$$B_y = \sqrt{B_\xi^2 + B_\eta^2} \quad (43)$$

$$D = r\sin(\lambda + \gamma) \quad (44)$$

Note that the equations for the components of magnetic field intensity express the cubic law of a magnetic dipole multiplied by a function $H_1$ or $H_2$ that accounts for the effect of skin depth. The latter is known from an above ground calibration, as described above. Details of these functions can be derived employing either geophysical theory or dimensional analysis. Further, note that equation 44 for transmitter depth is uncoupled from the other equations allowing independent solution for the position coordinates r and $\lambda$ of the FLP based on the following nonlinear equations:

$$B_\eta\left(r, \lambda, \frac{r}{\delta}\right)\tan\gamma - B_\xi\left(r, \lambda, \frac{r}{\delta}\right) = 0 \quad (45)$$

$$B_y^2 - B_\xi^2\left(r, \lambda, \frac{r}{\delta}\right) - B_\eta^2\left(r, \lambda, \frac{r}{\delta}\right) = 0 \quad (46)$$

where the variables have been defined above. These equations can be solved employing any of the standard solution methods for sets of nonlinear equations such as, for example, Newton's and function iteration.

Figure 14:
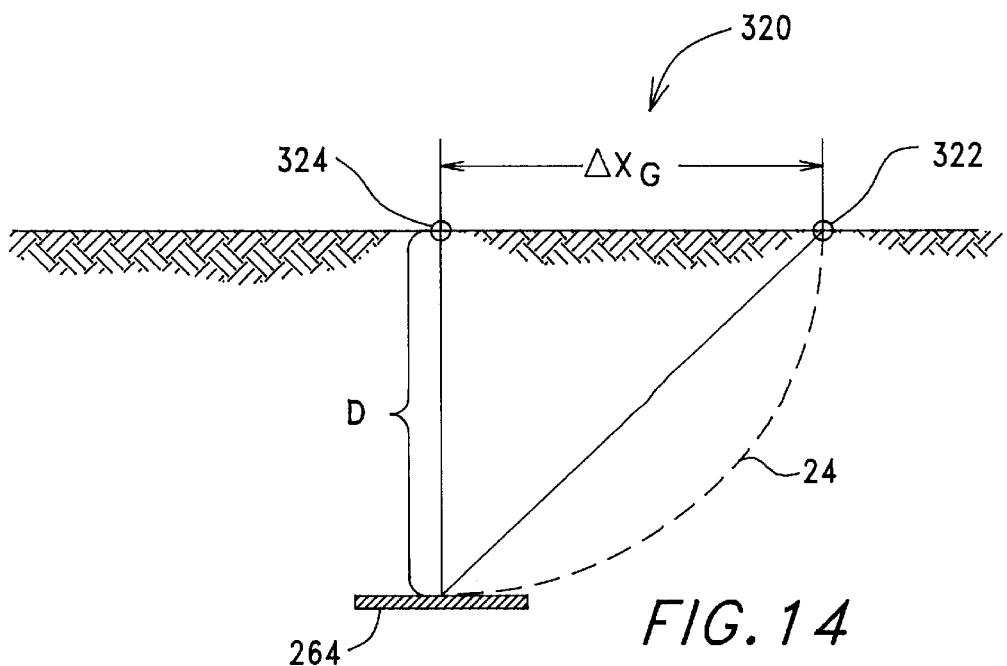
FIG. 14 is a diagrammatic elevational view of a surface offset distance position determination shown here to illustrate a variation in which an above ground measurement between the forward locate point and an overhead point directly above the boring tool is used in determining the skin depth corrected depth of the boring tool.

Turning now to FIG. 14, in a third scenario, a surface offset distance position determination setup is generally indicated by the reference number 320. This setup technique uses the FLP and OH points indicated by the reference numbers 322 and 324, respectively. In this regard, it is noted that the locations of these points are affected as a result of skin depth. At forward locate point 322, the horizontal component, $B_x$, of the magnetic flux intensity vanishes. This fact can be used to derive a formula for transmitter depth D as a function of a horizontal distance, $\Delta x_G$, at the surface of the ground between OH point 324 and FLP 322. In applications where skin effect can be neglected, a simple equation for depth, D, can be derived from the cubic law for a dipole field:

$$D = \sqrt{2}\Delta x_G \quad (47)$$

In order to account for skin effect relying on $B_x = 0$, a different form of the equation is used which is written in symbolic notation as:

$$B_x\left(\frac{r}{\delta}, \Delta x_G, D\right) = 0 \quad (48)$$

Here, skin depth $\delta$ is obtained from an above ground two-point calibration as described earlier and $\Delta x_G$ can be measured easily using available standard distance measurement methods. Details of this equation can also be derived from geophysical theory, e.g., the aforementioned work published by Wait. In general, an explicit formula for depth cannot be derived from this equation since it will most likely be nonlinear in D, therefore, the expression must be solved numerically employing a suitable standard solution method such as Newton's or function iteration.

Figure 15:
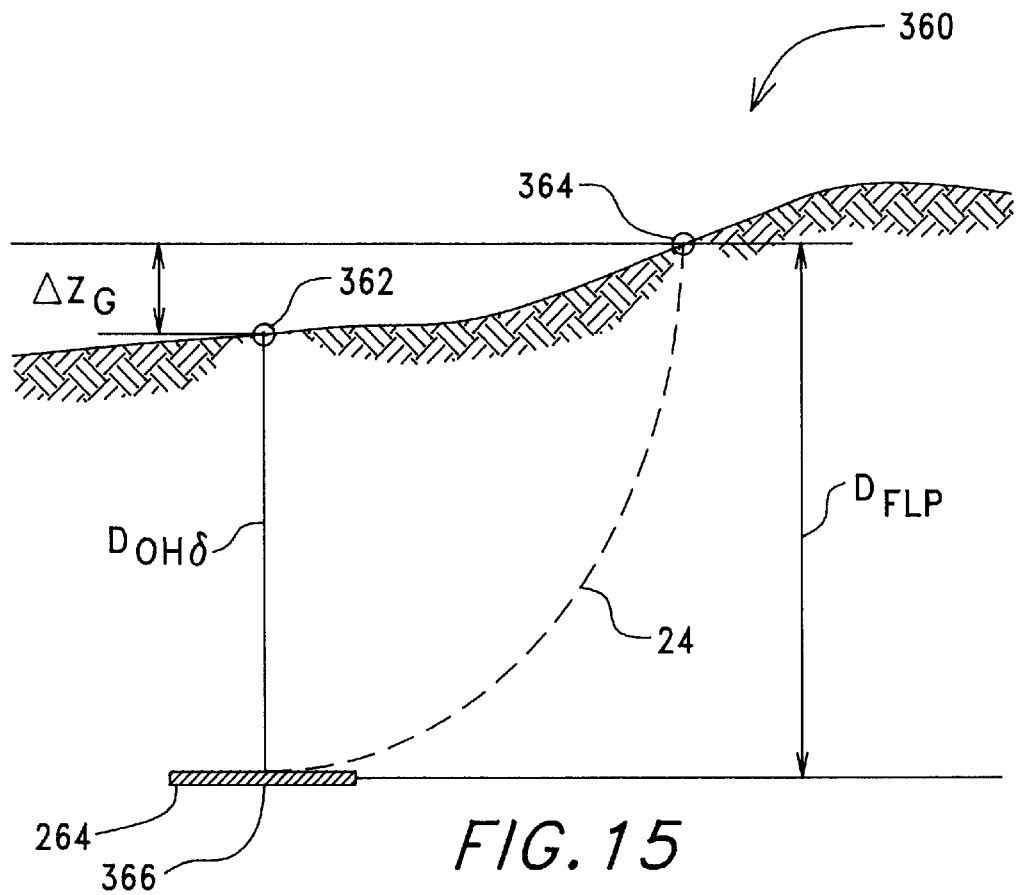
FIG. 15 is a diagrammatic elevational view of an above ground elevation offset distance position determination setup, shown here to illustrate still another variation in which a forward locate point skin depth correction factor is developed for use in subsequent drilling operations.

Attention is now directed to FIG. 15 which illustrates a fourth, above ground elevation offset distance position determination setup generally indicated by the reference number 360. This setup technique is useful in conjunction with an OH measurement of drill head depth, $D_{OH\delta}$, which accounts for skin depth such as, for example, described above in the OH position determination setup associated with FIG. 11. The elevation offset technique requires a measurement of elevation change, $\Delta z_G$, between an OH point 362 and a FLP 364 with transmitter 264 at one position 366. Generally, this measurement will be performed once early in a drilling operation. With the drill head at position 366, FLP-depth, $D_{FLP\delta}$, (wherein $\delta$ indicates compensation for skin depth) can be calculated from the over head depth, $D_{OH\delta}$, and the measured elevation change using:

$$D_{FLP\delta} = D_{OH\delta} + \Delta z_G \quad (49)$$

Still referring to FIG. 15, the present technique is especially useful for a walk-over locator that is able to accurately measure over-the-head depth accounting for skin effect, but is not configured for skin depth compensation from the FLP. Since depth measured with such a locator at a forward locate point does not include skin effect, the ratio $D_{FLP\delta}/D_{FLP}$ obtained at transmitter position 366 can be employed to correct subsequent FLP depth measurements using the formula:

$$D_{FLP\delta_k} = \left(\frac{D_{OH\delta} + \Delta z_G}{D_{FLP}}\right)_1 D_{FLP_k} \quad (50)$$

Here, the subscripts 1 and k denote the first and k-th locating positions respectively. It should be noted that this correction is linear and hence can only be expected to give accurate results for small depth variations and homogeneous soil properties.

Figure 16:
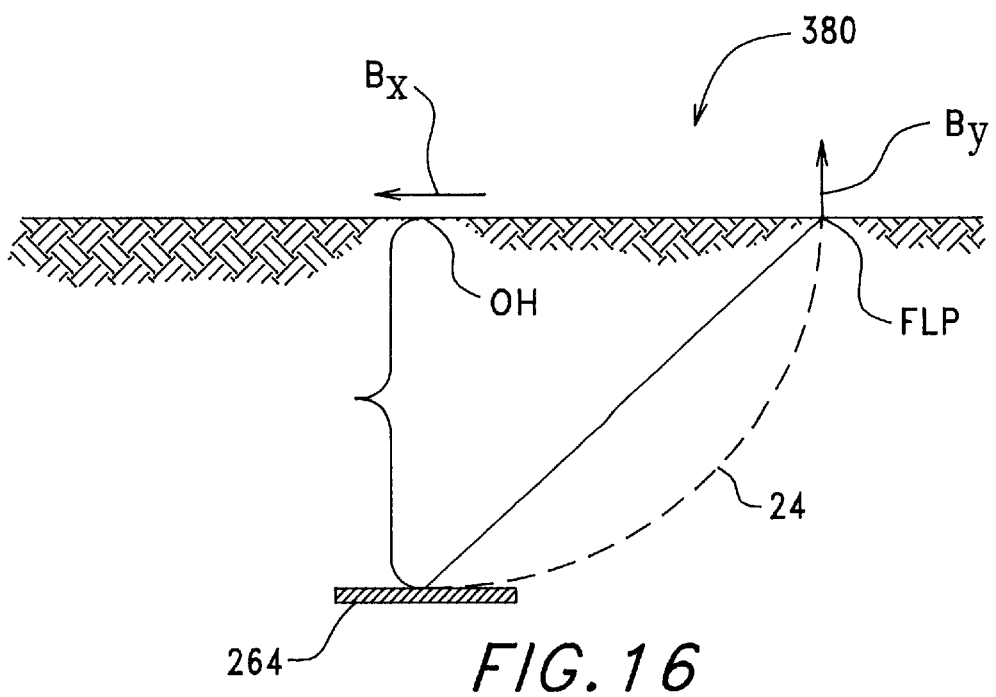
FIG. 16 is a diagrammatic elevational view of a dual point common elevation position determination setup, shown here to illustrate the use of two identifiable points having a substantially common elevation.

Referring to FIG. 16, a dual point common elevation position determination setup is generally indicated by the reference number 380. Accordingly, magnetic measurements are made at any two identifiable points having a common elevation. These measurements are combined to obtain transmitter depth in the presence of skin effects. It is assumed that ground elevation changes only moderately between these two points so that the same locator elevation can be maintained by simply raising or lowering the locator/detector unit relative to the surface of the ground. This approach does not require an above ground calibration since skin depth is determined from magnetic field data together with transmitter depth. Two such identifiable points are the OH and the FLP points, as indicated. At the OH location there is only a horizontal magnetic flux $B_x$ and at the forward locate point there is only a vertical flux component $B_y$. Even though transmitter 264 is shown in a level orientation in this figure, its pitch is not required to be zero. The governing equations have already been described above for techniques relying on separate OH and FLP measurements. Specifically, equations including (28) and (31) to (37) may be used for the solution of transmitter depth D, skin depth $\delta$ and the variables $r, \xi, \eta, \gamma, B_\xi, B_\eta$ defined above. An example of a practical solution method can be derived by modifying the approach given previously for solving the set of equations (31) to (37). There the method requires the simultaneous solution of the two nonlinear equations (42) and (43) for the geometric parameters $\gamma$ and r. Here D, $\delta$, $\Delta$, $\eta$ and r are obtained by solving the 4 nonlinear equations (28), (44), (45) and (46) simultaneously employing any standard numerical solution methods such as Newton's and function iteration.

In that skin depth compensation arrangements and associated methods disclosed herein may be provided in a variety of different configurations and modified in an unlimited number of different ways, it should be understood that the present invention may be embodied in many other specific forms without departing from the spirit of scope of the invention. Therefore, the present examples and methods are to be considered as illustrative and not restrictive, and the invention is not to be limited to the details given herein, but may be modified within the scope of the appended claims.

What is claimed is:

1. In an overall method of operating a system in which a boring tool is moved through the ground in a region which includes an electrical conductivity characteristic, said system including an above ground arrangement for tracking the position of and/or guiding the boring tool as the boring tool moves through the ground, said system being configured for transmitting a locating signal from the boring tool for reception by said above ground arrangement in said region for measurement of the locating signal by the above ground arrangement, the improvement comprising the steps of:

compensating for skin depth error by measuring said locating signal such that measurements of the locating signal include skin depth error introduced as a result of said electrical conductivity characteristic and, thereafter, using said measurements in a way which determines a skin depth corrected position of the boring tool.

2. The improvement of claim 1 wherein said measurements are produced by (i) transmitting the locating signal from the boring tool to said arrangement at a preselected number of different frequencies such that each frequency penetrates said region with a different skin depth, and (ii) measuring an intensity of the locating signal at each frequency to provide a number of intensity measurements corresponding to the preselected number of said different frequencies, and wherein the skin depth corrected position of the boring tool is determined by using said intensity measurements in combination.

3. The improvement of claim 2 wherein four preselected frequencies are used.

4. The improvement of claim 3 wherein the preselected frequencies are in the range of 2 to 40 kHz.

5. The improvement of claim 2 wherein said intensity measurements are combined to extrapolate a zero frequency magnetic intensity for a particular set of said intensity measurements and, thereafter, the zero frequency magnetic intensity is used to determine the position of the boring tool relative to said arrangement.

6. The improvement of claim 2 wherein determining the position of the boring tool using said intensity measurements includes the steps of (i) developing a set of magnetic intensity equations such that one equation corresponds to each frequency for use with one of the intensity measurements, said equations including a number of coefficients in frequency equal to the number of intensity measurements such that one of the coefficients is a constant which represents a steady state electromagnetic value of the locating signal, (ii) solving for said coefficients including the constant coefficient and (iii) using said constant coefficient as an electromagnetic reading at zero frequency to determine the position of the boring tool relative to said arrangement at zero frequency such the effect of skin depth is substantially reduced.

7. The improvement of claim 6 wherein four of said frequencies are used and wherein said magnetic intensity equations are in the form:

$$S_1 = S_0 + af_1^{0.5} + bf_1 + cf_1^{1.5}$$

$$S_2 = S_0 + af_2^{0.5} + bf_2 + Cf_2^{1.5}$$

$$S_3 = S_0 + af_3^{0.5} + bf_3 + cf_3^{1.5}$$

$$S_4 = S_0 + af_4^{0.5} + bf_4 + cf_4^{1.5}$$

where $S_0$ is said constant coefficient, a, b, and c are the remaining coefficients and $S_1$–$S_4$ are the intensity measurements corresponding to preselected frequencies $f_1$–$f_4$.

8. The improvement of claim 1 wherein certain ones of said measurements are used to determine a value for skin depth to be used during drilling, these certain measurements being obtained in a calibration procedure by transmitting the locating signal from the boring tool to said arrangement prior to drilling.

9. The improvement of claim 8 wherein said calibration procedure is performed with the boring tool above ground.

10. The improvement of claim 8 wherein said locating signal is transmitted at one fixed frequency.

11. The improvement of claim 8 wherein said arrangement includes a portable walkover detector for use in locating said boring tool by (i) using the walkover detector to generate electromagnetic data which identifies an overhead position on the surface of the ground that is directly above said boring tool in a way which is not subject to skin depth error, (ii) measuring the overhead signal strength of the locating signal transmitted from the boring tool and (iii) using the overhead signal strength in conjunction with the determined value of the skin depth to determine the depth of the boring tool below the identified overhead position on the surface of the ground such that the depth of the boring tool is established based at least in part on said skin depth.

12. The improvement of claim 11 wherein said depth of the boring tool along with the signal strength of the locating signal are established by successive approximation using the expression:

$$D = \left(\frac{m}{B_x} G\left(\frac{D}{\delta}\right)\right)^{\frac{1}{3}}$$

where D is the depth of the boring tool, m is the signal strength of said locating signal, $B_x$ is the signal strength of the locating signal as measured by the walkover detector at said overhead position, $\delta$ is skin depth, and G is a function representing deviation of magnetic measurements in a conductive region.

13. The improvement of claim 12 wherein magnetic measurements in a non-conductive region are consistent with a cubic law and wherein the function G represents deviation of magnetic measurements from the cubic law in a conductive region in terms of $D/\delta$.

14. The improvement of claim 12 wherein the expression $0 <= D/\delta < 3$ is satisfied.

15. The improvement of claim 8 wherein the boring tool moves through the ground along an intended path while transmitting the locating signal and moves in an orientation which includes pitch, said boring tool including pitch sensing means and said locating signal exhibiting a field defined forward point at the surface of the ground with the boring tool at a particular point along the intended path, said field defined forward point being vertically above an inground forward point on said intended path through which said boring tool is likely to pass and wherein said arrangement includes a portable walkover detector, the boring tool being located by (i) using the walkover detector to generate electromagnetic data which identifies said forward point, (ii) measuring the signal strength of the locating signal at said forward point, as transmitted from the boring tool at said particular point and (iii) using the measured signal strength of the locating signal at said forward point in conjunction with said determined value of the skin depth and a sensed pitch value, determining the depth of the boring tool at said particular point and a forward distance on said intended path from the particular point at which the boring tool is located to said forward inground point based at least in part on said skin depth such that the location of the boring tool is established along said intended path.

16. The improvement of claim 15 wherein the depth of the boring tool at said particular point and said forward distance are determined by solving the group of equations including:

$$B_\xi = B_\xi\left(\xi, \eta, \frac{r}{\delta}\right)$$

$$B_\eta = B_\eta\left(\xi, \eta, \frac{r}{\delta}\right)$$

$$\tan\gamma = \frac{B_\xi}{B_\eta}$$

$$D = r\sin(\lambda + \gamma)$$

$$B_y = \sqrt{B_\xi^2 + B_\eta^2}$$

$$\tan\lambda = \frac{\xi}{\eta}$$

$$r^2 = \xi^2 + \eta^2$$

where the locating signal is symmetric with respect to a dipole axis and where D is the depth of the boring tool, r is the distance between the forward point and the boring tool, $\xi$ is a projected distance of r onto the dipole axis of the boring tool, $\eta$, is a projected distance of r onto an axis which is perpendicular to the dipole axis, $\lambda$ is an angle between r and the dipole axis, $B_\xi$ is a component of locating signal intensity parallel to the dipole axis, $B_\eta$ is a radial component of locating signal intensity parallel to the normal of the dipole axis, $\gamma$ is measured pitch of the boring tool, B is the overall intensity of the locating signal and $\delta$ is the measured skin depth.

17. In an overall process in which a boring tool is moved through the ground within a region along an intended path while transmitting a locating signal, said region including an electrical conductivity characteristic and said locating signal exhibiting a field defined forward point which field defined forward point is vertically above an inground forward point on said intended path through which said boring tool is likely to pass with the boring tool initially located at a particular point on the intended path, said system including an above ground arrangement for tracking the position of and/or guiding the boring tool as it moves through the ground using a locating signal that is transmitted from the boring tool to said arrangement such that the electrical conductivity of said region results in a skin depth which modifies penetration of the locating signal into said region and, consequently, which produces skin depth error when magnetic readings of the locating signal are used to determine the location of the boring tool relative to said arrangement under an assumption that said region is electrically non-conductive, a method of determining the depth of said boring tool at said particular point, said method comprising the steps of:

a) measuring the skin depth in said region in a predetermined way;

b) identifying said field defined forward point on or above the surface of the ground and identifying an overhead point on or above the surface of the ground and directly above the boring tool at said particular point;

c) measuring a forward distance defined at the surface of the ground between the overhead point and the forward point; and d) using the forward distance, said skin depth and certain characteristics of said locating signal at said forward point, determining the depth of said boring tool at said particular point.

18. The method of claim 17 wherein said locating signal includes a vertical and a horizontal component and wherein the locating signal includes the characteristic of its horizontal component being equal to zero at said forward point.

19. In an overall process in which a boring tool is moved through the ground within a region along an intended path while transmitting a locating signal, said region including an electrical conductivity characteristic and said locating signal exhibiting a field defined forward point which field defined forward point is vertically above an inground forward point on said intended path through which said boring tool is likely to pass with the boring tool initially located at a particular point on the intended path, said system including an above ground arrangement for tracking the position of and/or guiding the boring tool as it moves through the ground using a locating signal that is transmitted from the boring tool to said arrangement such that the electrical conductivity of said region results in a skin depth which modifies penetration of the locating signal into said region and, consequently, which produces skin depth error when magnetic readings of the locating signal are used to determine the location of the boring tool relative to said arrangement under an assumption that said region is electrically non-conductive, a method of determining the depth of the boring tool from any forward point along the intended path of the boring tool, said method comprising the steps of:

a) configuring the intended path in said region such that said forward point is at a higher elevation on the surface of the ground than said particular point;

b) establishing the actual depth of the boring tool at said particular point;

c) measuring a vertical elevation difference between the particular point and the forward point;

d) sensing the locating signal at said forward point while the boring tool is at said particular point to determine an uncorrected depth of the boring tool which is subject to skin depth error;

e) using the measured vertical elevation difference, the actual depth of the boring tool at said particular point and the uncorrected depth of the boring tool measured from the forward point, determining a forward point skin depth correction factor;

f) after having advanced the boring tool to a subsequent particular point on said intended path associated with a subsequent forward point, determining a corrected depth of the boring tool i) measuring the locating signal at said subsequent forward point using said arrangement to produce electromagnetic data, ii) determining the uncorrected depth of the boring tool at said subsequent particular point using the electromagnetic data such that the uncorrected depth at the subsequent particular point is subject to skin depth error, and iii) multiplying the uncorrected depth at the subsequent particular point by said forward skin depth correction factor to determine depth of the boring tool at the subsequent particular point corrected for skin depth.

20. The method of claim 19 wherein said skin depth correction factor is given by $$\frac{D_{OH\delta} + \Delta z_G}{D_{FLP}}$$

where $D_{OH\delta}$ is the actual depth of the boring tool at said particular point, $\Delta z_G$ is the elevation difference between the particular point and the forward point and $D_{FP}$ is the uncorrected depth of the boring tool measured at said forward point.

21. In a system in which a boring tool is moved through the ground in a region which includes an electrical conductivity characteristic, said system including an above ground arrangement for tracking the position of and/or guiding the boring tool as it moves through the ground using a locating signal that is transmitted from the boring tool and for reception by said above ground arrangement such that the electrical conductivity of said region results in a skin depth which modifies penetration of the locating signal into said region and, consequently, which produces skin depth error when one or more measurements of the locating signal are used, as measured by the above ground arrangement and influenced by skin depth, to determine the location of the boring tool relative to said above ground arrangement under an assumption that said region is electrically non-conductive, the improvement comprising:

a compensation arrangement forming part of said boring tool and/or part of said above ground arrangement for compensating for skin depth error based on said measurements of said locating signal such that a skin depth corrected position of the boring tool is established.

22. The improvement of claim 21 wherein said compensation arrangement includes a calibration arrangement which is configured for determining the skin depth in said region using said locating signal in a predetermined way and said compensation arrangement further includes a processing arrangement which is configured for using the skin depth during a drilling operation to determine said skin depth corrected position of the boring tool.

23. The improvement of claim 22 wherein said compensation arrangement forms part of the above ground arrangement.

24. The improvement of claim 22 wherein said locating signal is transmitted at one frequency.

25. The improvement of claim 24 wherein said boring tool includes a dipole transmitter configured for transmitting said locating signal such that the locating signal is in the form of a dipole field having a center axis and defining an orthogonal plane perpendicular to said center axis which bisects said dipole field and wherein the above ground arrangement is a portable detector which houses said compensation arrangement and which includes said calibration arrangement and further includes a receiving axis along which said locating signal is detected, said calibration arrangement being configured for determining the skin depth using at least two measurements of said locating field which are obtained by positioning the dipole transmitter on the surface of the ground such that said center axis extends generally along the surface of the ground with an orthogonal axis in said orthogonal plane also extending generally along the surface of the ground and wherein the locating signal from the dipole transmitter is measured at first and second offset distances from said center axis to obtain said two measurements, each measurement being obtained with the portable detector placed on said orthogonal axis at said first and second offset distances, respectively, having the receiving axis of the portable detector oriented parallel to said center axis.

26. The improvement of claim 21 wherein said compensation arrangement includes means forming part of said boring tool and part of said above ground arrangement for transmitting said locating signal through said region using at least two different frequencies for any particular location of the boring tool within said region and for receiving the locating signal at said different frequencies to generate measurements of the locating field at said different frequencies for use in determining said skin depth corrected position of the boring tool at any particular location within said region.

27. The improvement of claim 26 wherein the effect of skin depth is determined by extrapolating a zero frequency magnetic intensity for a particular set of said intensity measurements and, thereafter, the zero frequency magnetic intensity is used to determine the particular location of the boxing tool relative to said arrangement.

28. The improvement of claim 27 wherein said compensation arrangement includes processing means forming part of said above ground arrangement configured for using a set of magnetic intensity equations in which each equation corresponds to one frequency for use with one of the intensity measurements, said equations including a number of coefficients equal in number to the number of intensity measurements such that one of the coefficients is a constant which represents a steady state electromagnetic value of the locating signal, said processing means being configured for solving for said coefficients including the constant coefficient and, thereafter, for using said constant coefficient as an electromagnetic reading to determine the particular location of the boring tool relative to said arrangement at zero frequency such the effect of skin depth is reduced.

29. The improvement of claim 28 wherein four of said frequencies are used and wherein said magnetic intensity equations are in the form:

$S_1 = S_0 + af_1^{0.5} + bf_1 + cf_1^{1.5}$ $S_2 = S_0 + af_2^{0.5} + bf_2 + cf_2^{1.5}$ $S_3 = S_0 + af_3^{0.5} + bf_3 + cf_3^{1.5}$ $S_4 = S_0 + af_4^{0.5} + bf_4 + cf_4^{1.5}$ where $S_0$ is said constant coefficient, a, b, and c are the remaining coefficients and $S_1$–$S_4$ are the intensity measurements corresponding to the plurality of frequencies $f_1$–$f_4$.

30. The improvement of claim 26 wherein said boring tool includes transmitter means forming part of said compensation arrangement configured for transmitting said locating signal at said frequencies and wherein said above ground arrangement includes receiver means forming part of said compensation arrangement for receiving the locating signal at said frequencies.

31. The improvement of claim 26 wherein transmitter means transmits said frequencies in an alternating manner such that one frequency at a time is transmitted.

32. The improvement of claim 31 wherein said frequencies alternate at a rate which effectively causes all of the frequencies to be transmitted from any one location of the boring tool irrespective of movement of the boring tool caused by a drilling operation.

33. The improvement of claim 31 wherein said frequencies alternate at a frequency at or above approximately 10 Hz.

34. The improvement of claim 21 wherein said above ground arrangement includes a portable walkover detector configured for receiving said locating signal and said locating signal is transmitted from said boring tool.

35. The improvement of claim 34 wherein said compensation arrangement includes means forming part of said boring tool and part of said portable walkover detector for transmitting said locating signal through said region using at least two frequencies for any particular location of the boring tool within said region and for receiving the locating signal at said frequencies to generate measurements of the locating field at said frequencies for use in determining said skin depth corrected position of the boring tool at any particular location within said region.

36. The improvement of claim 21 wherein said locating signal is transmitted from said boring tool and wherein said above ground arrangement includes at least two detectors, each of which is configured for receiving said locating signal at a fixed location within said region to produce said measurements of the locating signal.

37. The improvement of claim 36 wherein said compensation arrangement includes means forming part of said boring tool for transmitting said locating signal using at least two different frequencies and means forming part of said above ground detectors for receiving said frequencies foi any particular location of the boring tool within said region for use in generating measurements of the locating field at said frequencies to determine said skin depth corrected position of the boring tool.

38. A drilling apparatus for performing underground boring in a region having an electrical conductivity which results in a skin depth that modifies penetration of electromagnetic signals into said region, said apparatus comprising:

a) a boring tool which is configured for moving through the ground including means for emitting a locating signal using at least two frequencies each of which is subject to said skin depth;

b) an above ground arrangement configured for receiving said locating signal at said frequencies as the boring tool moves underground to determine an intensity measurement at each of said frequencies where each intensity measurement varies according to the frequency at which that intensity measurement is made as a result of skin depth influence; and c) a processing arrangement forming part of the above ground arrangement for using the magnetic intensity measurement at each of the received frequencies to establish a corrected position of the boring tool in a way which compensates for said skin depth based, at least in part, on variation of the intensity measurement among said frequencies.

39. The apparatus of claim 38 wherein the effect of said skin depth is compensated for by configuring said processing arrangement to extrapolate a zero frequency electromagnetic intensity for a particular set of said intensity measurements produced at substantially one particular location of the boring tool and, thereafter, using the zero frequency electromagnetic intensity to determine the particular location of the boring tool corrected for said skin depth.

40. The apparatus of claim 39 wherein said processing arrangement is configured for using a series of magnetic intensity equations in which each equation corresponds to one of said frequencies for use with one of the intensity measurements, said equations including a number of coefficients equal in number to the number of intensity measurements such that one of the coefficients is a constant which represents a steady state electromagnetic status of the locating signal, said processing arrangement being configured for extrapolation by solving for said coefficients including the constant coefficient and, thereafter, using said constant coefficient as an electromagnetic reading to determine the particular location of the boring tool relative to said arrangement at zero frequency.

41. The apparatus of claim 40 wherein four of said frequencies are used and wherein said magnetic intensity equations are in the form:

$S_1 = S_0 + af_1^{0.5} + bf_1 + cf_1^{1.5}$ $S_2 = S_0 + af_2^{0.5} + bf_2 + cf_2^{1.5}$ $S_3 = S_0 + af_3^{0.5} + bf_3 + cf_3^{1.5}$ $S_4 = S_0 + af_4^{0.5} + bf_4 + cf_4^{1.5}$ where $S_0$ is said constant coefficient, a, b, and c are the remaining coefficients and $S_1$–$S_4$ are the intensity measurements corresponding to a plurality of frequencies $f_1$–$f_4$.

42. The apparatus of claim 38 wherein said locating signal is transmitted from the boring tool and said above ground arrangement includes a portable walkover detector configured for receiving said locating signal at said predetermined frequencies.

43. The apparatus of claim 38 wherein said locating signal is transmitted from said boring tool and wherein said above ground arrangement includes at least two detectors, each of which is configured for receiving said locating signal at said frequencies in a fixed location within said region.

44. The apparatus of claim 38 wherein four of said predetermined frequencies are used.

* * * * *